CONTROL MECHANISM FOR BOWLING PIN SPOTTING MACHINES

Filed April 14, 1945 10 Sheets-Sheet 1

INVENTOR
WILLIAM C. BROEKHUYSEN
BY George E. Hastings
ATTORNEY

CONTROL MECHANISM FOR BOWLING PIN SPOTTING MACHINES

Filed April 14, 1945 10 Sheets-Sheet 2

INVENTOR
WILLIAM C. BROEKHUYSEN
BY George L. Hastings
ATTORNEY

CONTROL MECHANISM FOR BOWLING PIN SPOTTING MACHINES

INVENTOR
WILLIAM C. BROEKHUYSEN
BY George E. Hastings
ATTORNEY

Oct. 17, 1950 W. C. BROEKHUYSEN 2,525,766

CONTROL MECHANISM FOR BOWLING PIN SPOTTING MACHINES

Filed April 14, 1945 10 Sheets-Sheet 4

INVENTOR
WILLIAM C. BROEKHUYSEN
BY George S. Hastings
ATTORNEY

Oct. 17, 1950 W. C. BROEKHUYSEN 2,525,766

CONTROL MECHANISM FOR BOWLING PIN SPOTTING MACHINES

Filed April 14, 1945 10 Sheets-Sheet 5

INVENTOR
WILLIAM C. BROEKHUYSEN
BY George S. Hastings
ATTORNEY

CONTROL MECHANISM FOR BOWLING PIN SPOTTING MACHINES

Filed April 14, 1945

10 Sheets-Sheet 6

INVENTOR
WILLIAM C. BROEKHUYSEN
BY George S. Hastings
ATTORNEY

CONTROL MECHANISM FOR BOWLING PIN SPOTTING MACHINES

Filed April 14, 1945 10 Sheets-Sheet 7

INVENTOR
WILLIAM C. BROEKHUYSEN
BY George Hastings
ATTORNEY

CONTROL MECHANISM FOR BOWLING PIN SPOTTING MACHINES

INVENTOR
WILLIAM C. BROEKHUYSEN
BY George S Hastings
ATTORNEY

CONTROL MECHANISM FOR BOWLING PIN SPOTTING MACHINES

Filed April 14, 1945 10 Sheets-Sheet 9

INVENTOR
WILLIAM C. BROEKHUYSEN
BY George S. Hastings
ATTORNEY

INVENTOR
WILLIAM C. BROEKHUYSEN
BY George L Hastings
ATTORNEY

Patented Oct. 17, 1950

2,525,766

UNITED STATES PATENT OFFICE 2,525,766

CONTROL MECHANISM FOR BOWLING PIN SPOTTING MACHINES

William C. Broekhuysen, Garden City, N. Y., assignor to American Machine and Foundry Company, a corporation of New Jersey Application April 14, 1945, Serial No. 588,380

20 Claims. (Cl. 273—43)

This invention relates to bowling pin setting machines and more particularly to foul control mechanism associated with such machines which can be set into operation either automatically or manually, controlling the operation thereof in accordance with the requirements and rules of the game whenever a player makes a foul.

In bowling alleys approved by the American Bowling Congress, each alley is provided with a foul line extending transversely across the alley where the head end of the alley joins the approach or ball rolling or throwing portion. The foul line, therefore, establishes a limit beyond which a player may not move in throwing or rolling a ball at pins standing at the far end of the alley. In the case of a two-ball frame such as is customary in ten-pins, if a foul is made on the first ball thrown, no score is counted and a new set of pins is placed on the alley preparatory to throwing the second ball. If on the second ball a foul is made, no score is counted and ten pins are spotted awaiting the playing of the next frame.

Rules pertaining to fouls are set up by the American Bowling Congress and are enforced in all tournament and league games. Generally fouls are declared by a foul judge located at a specified distance from the head of the alley who watches the play of the game and calls fouls whenever under the rules a foul should be declared.

The problem which is solved by the present invention is that of automatically controlling the operation of a bowling pin setting machine or spotter so that if and when a player fouls on the first ball of a frame, the declaration of the foul results in automatically changing the normal sequence of operations of the machine in such a way that the machine operates in conformity with the prescribed rules of play with the least loss of time.

It will be seen, therefore, that in the case of any completely automatic foul detector which meets the approval of the American Bowling Congress, each foul is automatically declared and the operation of the machine is automatically adapted to the proper sequence of play. The personal views of a player, and oversights by the judge, and the question of possibly debatable fouls neither have an effect upon the game nor interrupt the progress thereof.

In the event that a manual foul indicator is employed much the same conditions obtain as noted above. This is because the foul judge need not cry out and signal a player when the latter makes a foul and since a completely automatic control is initiated by the foul judge in declaring a foul, the machine is automatically controlled substantially simultaneously with the declaration of a foul and the importance of the personal equation is minimized.

In both cases an embarrassing situation is quickly overcome with a minimum of debates or questioning by the player. The present invention, therefore, solves a long standing problem and contributes materially to the orderly and proper playing of the game.

The present invention relates to the provision of automatic control means for conforming the operations of an automatic pin setting machine to conditions arising incident to fouling during the playing of the game.

According to my invention there is provided mechanism operable either automatically or manually to cause the machine to set a new frame of pins if a foul is made on the first ball of a frame thrown and, if desired, give a visual or audible signal or both to a player that such has been made. If a foul is made on the second ball, a visible or audible signal or both apprises the player of that fact but the operation of the machine continues normally in accordance with the prescribed cycle of operations of the machine.

It is an object of my invention to provide an automatic control mechanism for use with an automatic bowling pin setting machine which is operable to control the operation of a bowling pin setting machine in accordance with the rules of play whenever a player makes a foul either on the first or second ball or both during the course of play.

It is a further object of my invention to provide a bowling pin setting machine having mechanism for setting and resetting bowling pins preparatory to playing the game and control means therefor effective for removing all pins standing on the alley after the first ball of a frame has been thrown and a foul made and to reset a new frame of pins in playing arrangement on the alley pending the throwing of the next ball of the same frame, and to so control the cycle of operations of the machine that proper setting of pins in the further play of the game continues notwithstanding the fact that a foul has been made in an immediately preceding frame.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts:

Figure 1 is a sectional side elevation partly diagrammatic, showing a preferred embodiment of various mechanisms for automatically operating and controlling a bowling pin setting machine;

Figure 1*a* is a sectional side elevation, partly diagrammatic, showing the sweep, and its operating means and its relation to other mechanisms constituting the machine;

Although the invention is of general application, the preferred form illustrated is applied to a machine of the general type shown in Nejedly patent, No. 2,298,718, issued October 13, 1942. The following description describes and the drawings disclose in some detail as much of the Nejedly machine as is deemed necessary to make clear the structure and operation of the invention, and its application to a particular machine.

Figures 1, 2:
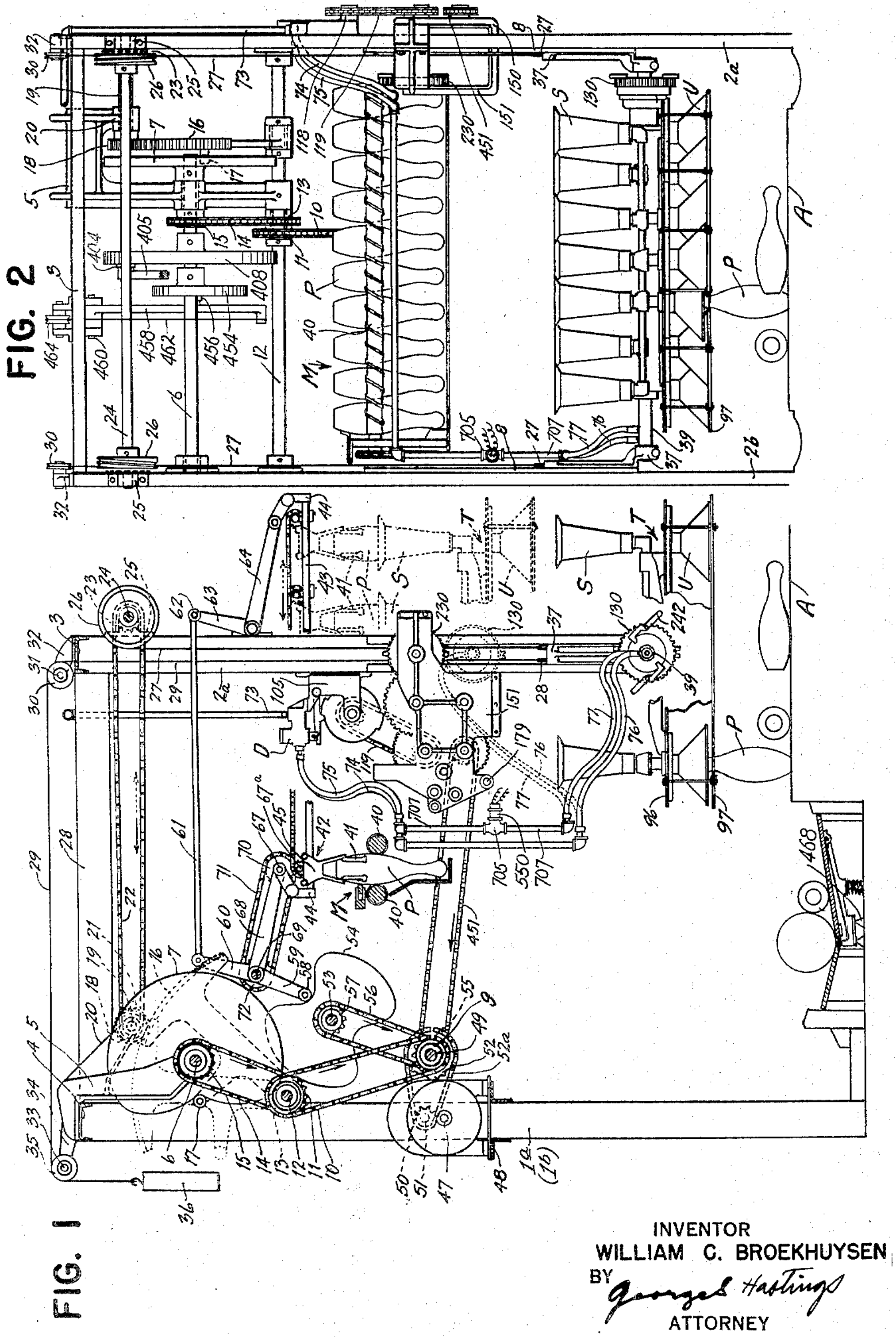
Figure 2 is a front elevation showing a part of the mechanism of Figure 1.
Figure 3:
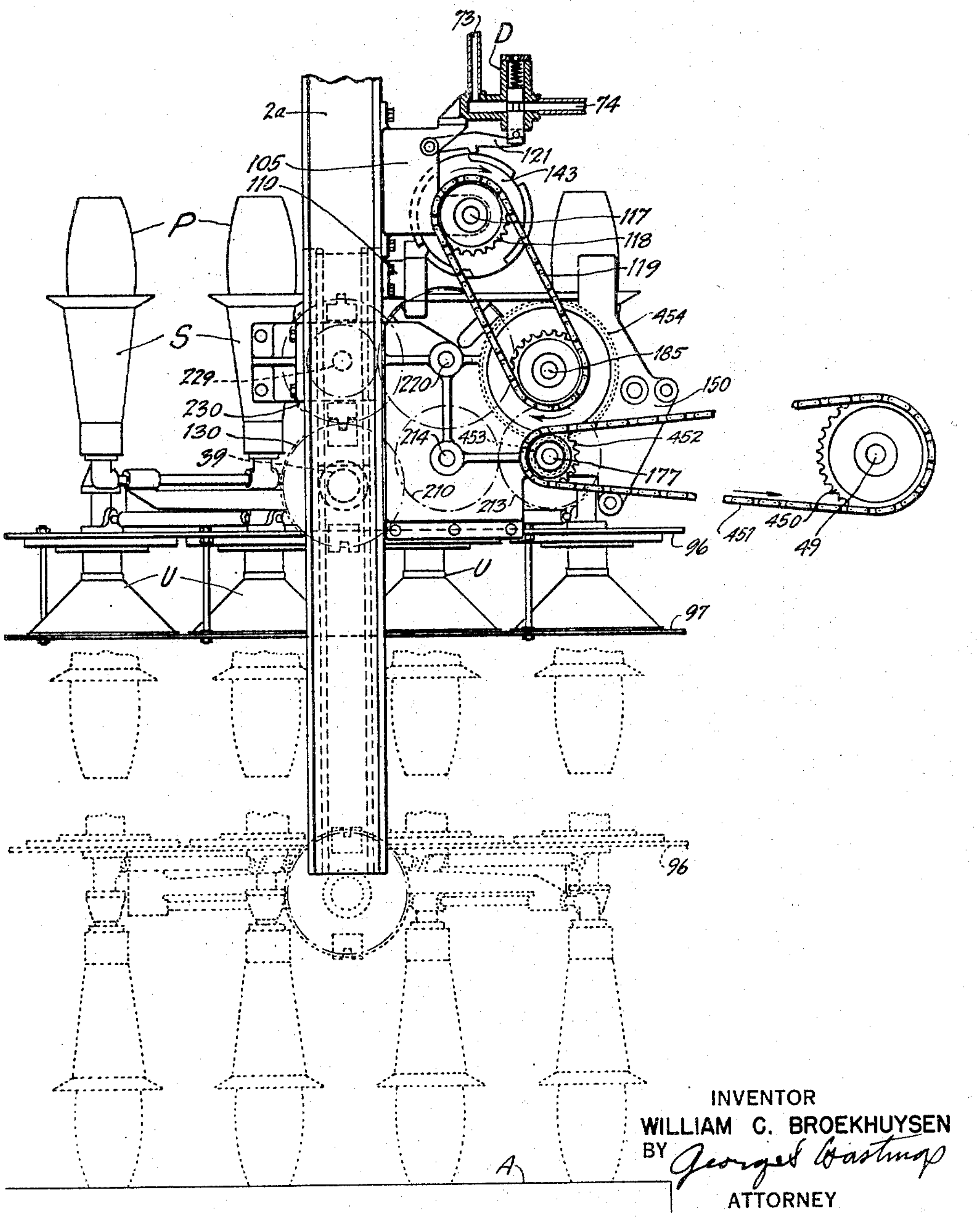
Figure 3 is a partial side elevational view of the control mechanism and the pin handling table.

Referring to the drawings, in Figures 1, 2 and 3 there are provided side frame uprights 1*a*, 1*b*, 2*a* and 2*b* connected by cross frame members 3 and 4 and longitudinal members 28. Supported on cross frame 4 is a bracket 5 in which one end of a shaft 6 is journalled; the other end is mounted in a bearing in side frame 1*b* (Figures 1 and 2) and carried by the shaft is a cam 7. Shaft 6 is rotated by means of shaft 49 through sprocket 9 fastened to shaft 49 and a sprocket chain 10 tracking sprocket 11 fastened to shaft 12. Through sprocket 13, also fixed to shaft 12, the drive is transferred by sprocket chain 14 to sprocket 15 mounted upon shaft 6 to rotate cam 7. Bowling pins, which are to be set upon the alley bed, are transferred from a magazine M by means of mechanism which may take the form of that shown in co-pending application, Serial No. 260,901, filed by Rupert E. Rundell on March 10, 1939, now Patent 2,388,707, granted November 13, 1945. The pins are placed in predetermined arrangement in the table T, which is raised, lowered and inverted relative to the alley bed. The desired up and down movement of table T to and from the alley bed is effected by means of cam 7 on which runs a cam follower 17 on an arm of gear segment 16 loosely mounted on shaft 12 and meshing with pinion 18 fixed to shaft 19 supported in arms 20 of bracket 5. Also fixed to shaft 19 is a sprocket 21 about which is trained sprocket chain 22 tracking a sprocket 23 fixed to shaft 24 mounted in brackets 25 supported by the side frames 2*a* and 2*b* of the machine.

Mounted on shaft 24 is a pulley 26 about which is trained cable 27 suitably connected at 28 to slide member 37, vertically slidable in guide 8 on side frame member 2*a* and provided at its lower end with a bracket 38 and a clamp nut 38*a* which secures hollow shaft 39 of table T in the slide bracket 38 for vertical movement. Also assisting in the vertical movement of the table T is a cable 29 which is trained over pulley 30 supported by shaft 31 journalled in bracket 32 mounted on cross frame member 3. Cable 29 extends over a similar pulley 35 mounted on shaft 33 supported by bracket 34 mounted on frame member 4. A counterweight 36 acts to balance the table. While I have only described the mountings of single cables, it will be apparent from Figure 2 that these cables are provided on both sides of the machine.

As shown in Figures 1, 2, 3 and 14 to 16, inclusive, the table T comprises a plurality of pin setter elements S mounted on one side and a plurality of respotting units U mounted on the other side. The arrangement of the setters S and respotting units U conforms to the usual playing positions of pins on the alley bed, but may be varied in any manner if desired.

Pins P, which are to be transferred and set upon the bed of a bowling alley, are fed from the pit of the alley by suitable mechanism (not shown), which may include spiral members 40 forming a part of a magazine indicated generally M wherein a plurality of pins, usually ten or more, is arranged in alignment for the removal therefrom of the desired number at a predetermined time by means of grippers 41 which are mounted upon a vertically movable conveyor device designated 42 which consists of a plurality of longitudinal bars 43 secured to transverse supports 44. On bars 43 are slidably mounted carriages 45 which in the preferred embodiment are provided with independent grippers 41 which engage and grip the required number of up-ended pins in magazine M for transfer to pin setters S (Figure 1).

The raising and lowering of the table T and operation of the pin transfer mechanism 42 is accomplished by means of a motor 47 mounted upon frames 1a, 1b of the machine at 48. A stud shaft 49 is driven by means of the sprocket 50 from the motor shaft 51 through a sprocket 52 mounted thereon and a chain 52a. The drive is transferred from shaft 49 to shaft 6 in the manner described hereinbefore. Shaft 53 on which is mounted cam 54 which causes the raising and lowering of pin transfer 42, is driven by means of sprocket 55 mounted on shaft 49 through sprocket chain 56 tracking a sprocket 57 on shaft 53. Cam 54 is provided with high and low portions (as shown in Figure 1) and whenever a low portion is engaged by cam follower 58 on lever 59, the grippers 41 will be either in pin receiving position over the magazine M or in pin delivering position over setters S. Lever 59 is provided with an arm 60 to which is attached a link 61 connected at 62 to lever 63 provided with an arm 64 pivotally connected to bar 44 forming a cross member of the frame of transfer 42.

The carriages 45 are moved longitudinally along bars 43 by means of pinions (not shown) mounted on shaft 69 journalled in arm 68 which also forms a part of lever 59 mounted on shaft 69. On shaft 69 is provided a sprocket 72 over which tracks a sprocket chain 71 engaging the sprocket 70 on shaft 67. Shaft 69 is driven by means of a pinion (not shown) fixed thereto engaging a suitable driving means, such as a gear segment (not shown) of the type described and disclosed in the above referred to Rundell patent. The bowling pins are lifted from spirals 40 by grippers 41, moved clear thereof, transferred longitudinally and located in proper arrangement in pin setters S where they are held while the carriages 45 with their grippers 41 move back to obtain a new set of pins.

Figures 17, 18, 19:
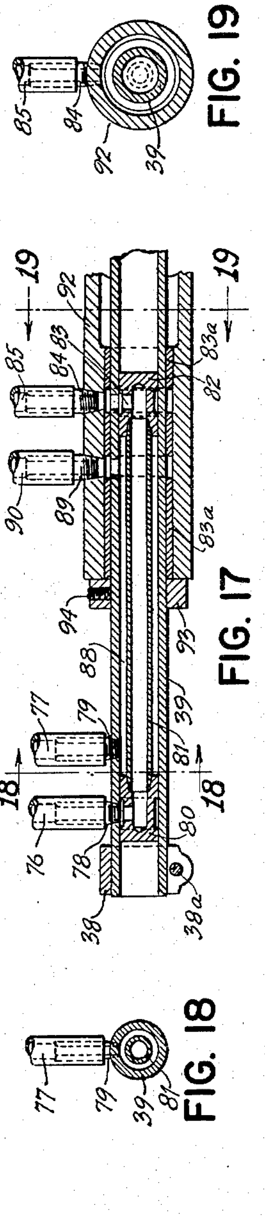
Figure 17 is a sectional view showing the suction inlet to the pin setter table.
Figure 18 is a sectional view on line 18—18 of Figure 17.
Figure 19 is a sectional view on line 19—19 of Figure 17.
Figure 23:
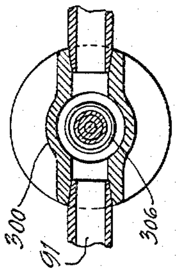
Figure 23 is a sectional view on line 23—23 of Figure 20.

In the manner disclosed in said Nejedly patent, after the carriages 45 have delivered the pins from the magazine to the setters S, the pins, gripped firmly therein by suitable means such as mechanical grippers or holders operated by suction, provided in the table from a suitable source of supply through a conduit 73 and valves $V_1$ and $V_2$, hereinafter described more in detail, are transferred to the playing surface or bed of alley A. Conduit 74 connects valve $V_1$ (Figures 4, 5 and 6) through a flexible conduit 76 to a hollow plug 78 fixed in hollow shaft 39 (Figure 17) so that suction created in conduits 74, 76 can be transmitted through a two-way element 80, which supports one end of a hollow shaft 81, and through two-way element 82 fastened to the other end of member 81 and provided with an opening connecting a hollow plug 84 with a flexible conduit 85. Conduit 85 conducts suction to ducts 87 which are connected to each of the pin setter units S. Since plug 84 is adapted to rotate relative to fixed hollow shaft 39, a circumferential suction passage 83 is formed in element 82, shaft 39 and sleeve 83a which surrounds shaft 39. In this manner it is possible to create the desired suction, and maintain it regardless of the rotation of table T.

In order to operate the resetting or respotting members U and provide for proper functioning of the foul control mechanism, there is provided a flexible suction conduit 77 which is attached to a pipe 707. This pipe is provided with a suitable automatically operable valve 705, such as an electrically operated valve of conventional design, joined to conduit 75. Valve 705 is operated whenever a foul is made when the first ball of a frame is thrown to cut out suction in line 75—77 of resetters U. This operation incapacitates resetters U and pins remaining standing as the result of that ball are not lifted and reset pending rolling of the next ball of the frame. Conduit 77 connects to a hollow plug member 79 fast in shaft 39, and suction is inducted into the hollow shaft therefrom and through a circumferential passage 88 into the bore of plug 89 about which is seated flexible conduit 90 which through ducts 91 supplies the several respotting units U with fluid pressure whenever pins are to be lifted and respotted.

Table or elevator T which is of the same general construction as that disclosed in the above referred to Nejedly patent, consists generally of a frame F provided with a central barrel or hub 92 mounted upon sleeves 83a for rotation about and relative to stationary shaft 39. Barrel 92 is held in proper position upon shaft 39 against lateral movement thereon by means of a collar 93 positioned about shaft 39 and locked in adjusted relationship thereto by means of a set screw 94. Referring to Figures 14, 15, 16 and 17, it will be seen that frame F supports the several setters S in usual substantially triangular pin formation, although any other desired arrangement may be used. Setters S are rigidly mounted upon pipes 87 which are clamped to the frame F by means of clamps 95 fastened to frame F.

Pin setters S corresponding to bowling pins, numbers 1 (I), 5 (V), 7 (VII), and 10 (X), in the form shown, are provided with elbows 87a connecting them to the system of pipes 87, while the remaining setters are mounted upon the pipes 87 by means of T units 87b. Attention is called to Figures 15 and 16 which illustrate this method of mounting the setters S. When suction is inducted into the system 87, by means of conduit 85, it will be uniformly distributed through the several pin setters as desired. The table T also comprises an upper plate 96 and a lower plate 97 provided with a number of openings 101 therein corresponding to the number of pin respotting units. These two plates are connected by means of spacers 98 which by means of suitable nuts 99 hold them rigidly separated one from another. Upper plate 96 is secured to frame F by means of braces 100 extending downwardly from the frame F. Slidably mounted upon lower plate 97 and substantially concentric with each of the openings 101 therein, are the bowling pin respotting units U, which are substantially the same as those shown and described in the above referred to Rundell patent. In order to prevent excessive lateral movement of the respotters U on their support, circular depending flanges 102 are mounted on the under surface of plate 96.

Sweep 400 (Figure 1*a*) is provided for removing fallen pins or deadwood and unwanted standing pins from the alley and gutters. In the normal play of the game such pins are moved by sweep 400 into the pit at the end of the alley after the throwing of each ball of a frame. If pins remain standing after the first ball is thrown, they are lifted, the alley is swept, and the pins are reset for the second ball of the frame. After the second ball is thrown, all pins standing or fallen are swept into the pit, and a new set of pins is placed on alley A for the next frame.

According to the present invention the normal operation of the machine is changed whenever a foul is made on the first ball of a frame. That is, if a foul is made on the first ball, the pin resetting mechanism is automatically rendered inoperative, and all standing pins, as well as any fallen pins on the alley A or in the gutters are swept into the pit. This means that the control mechanism operated by either of the foul detector devices shown in Figures 33 and 34 causes the pin setting mechanism of the machine to operate as if the first ball of the frame were a strike except that at the end of this cycle the control mechanism of the machine is in the position it would normally occupy when ready or waiting for a player to roll the second ball of the same frame. Pin transfer units 41 are then operated to deliver a set of pins to setters S, and table T is set into operation to effect the placement of a new set of pins on alley A pending the throwing of the second ball of the same frame.

Since the game being described is one in which two balls per frame are thrown, such as tenpins, the second ball is then the last allotted for a frame. After this ball is rolled, all pins, standing and fallen, are swept into the pit, and a new set of pins is delivered by setters S to alley A, awaiting the throwing of the first ball of the next frame.

A sweep and operating mechanism such as shown and described in Rundell patent, No. 2,250,503, granted July 29, 1941, is well adapted for use in connection with the present invention. The sweep consists of a transverse member 400, preferably provided adjacent the ends with projections 402 adapted to run in the gutters so that as the sweep travels back and forth along the pin supporting section of the alley clean sweeping is assured.

Figures 1A, 35:
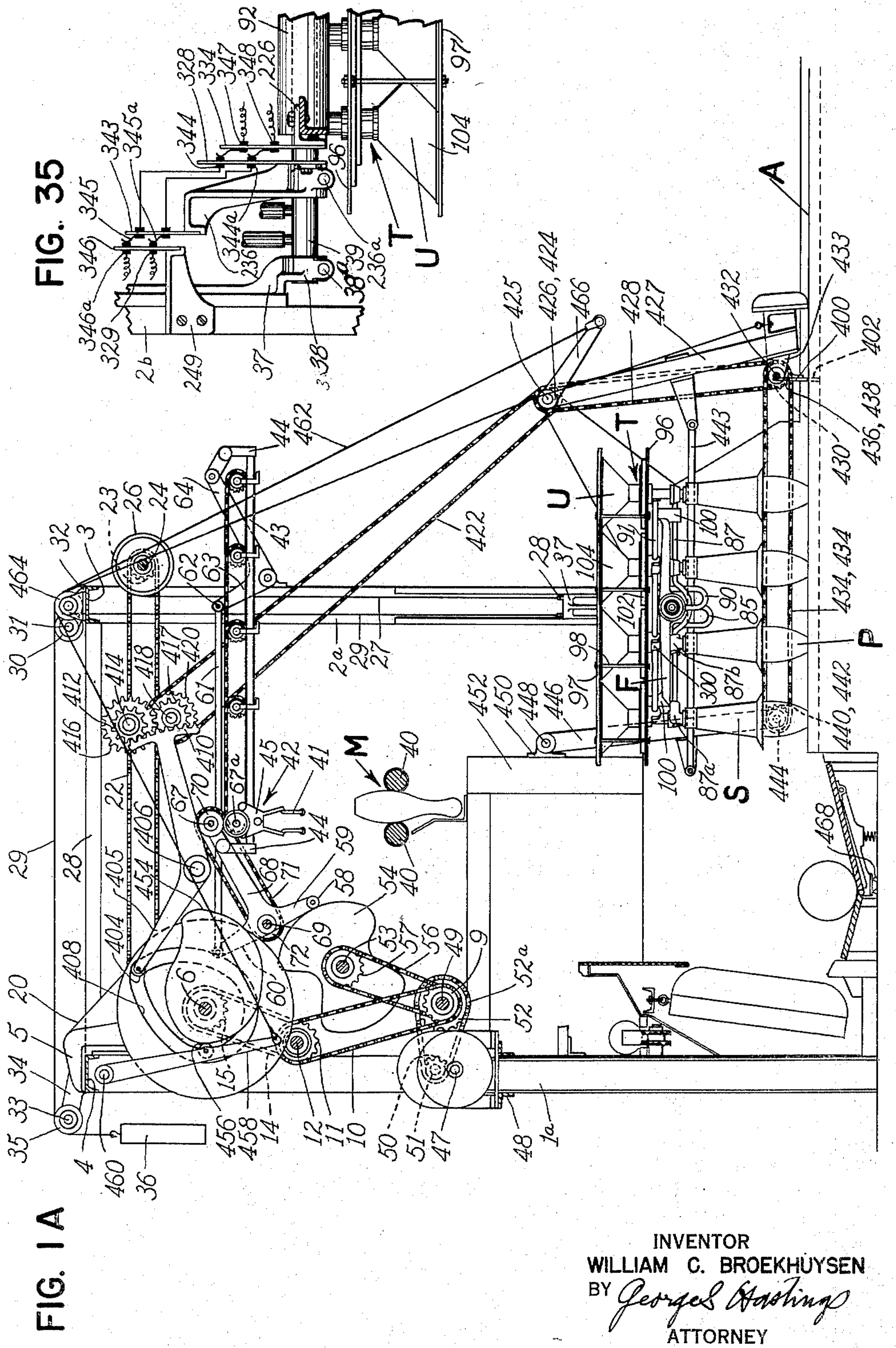
Figure 35 shows a detail of the electric control system.

The mechanism for moving sweep 400 longitudinally back and forth along alley A is shown in Figure 1*a*. Lever 405 pivotally mounted on shaft 406 suitably supported in the machine frame is provided with a cam follower 404 engaging a cam 408 fixed to shaft 6. Lever 405 is also provided with a gear segment 410 meshing with a pinion 412 on shaft 414, which shaft also supports a pinion 416 meshing with a gear 417 on shaft 418. Fixed to shaft 418 is a sprocket 420 on which runs a chain 422 which drives sprocket 424 on shaft 425. Sprocket 426 on shaft 425 through chain 428 running on sprocket 430 on shaft 432 drives shaft 432. In this manner the drive is transferred to spaced sweep supporting chains 434 running on sprockets 436, 438 on shaft 432 mounted in brackets 433 fixed to spaced arms 427 secured to shaft 425, and sprockets 440, 442 on shaft 444 supported in arms 446 pivotally mounted at 448 in brackets 450 secured to machine frame members 452.

Sweep supporting arms 427, 446 are raised and lowered in proper timed relation to locate the sweep in operative position relative to the alley and return it to inoperative position thereabove. Links 443 are pivotally connected to brackets on arms 427, 446 to insure substantially parallel movement of the arms and proper location of the sweep in operative position relative to the alley and in inoperative position above the alley. Movement of sweep 400 to and from alley A is effected by a cam 454 which is engaged by a cam follower 456 on lever 458 pivotally mounted on pin 460. The rotation of cam 454 causes lever 458 to swing on pin 460 and pay out cable 462, having one end fastened to lever 458. Cable 462 runs over a pulley 464 and is secured at its other end to a lever 466 fixed to shaft 425. Continued rotation of cam 454 results in the return of the sweep frame to inoperative position above the alley where it remains, until the next ball of a frame is thrown, and a new sequence of operations is started by the arrival of the ball in the pit which closes a switch 468 in the main control circuit (not shown) but which is the same as that shown and described in Rundell patent, No. 2,250,503.

In order to control the suction in the pin setters S and respotting units U, there has been provided a housing 105 which has lugs 106 through which project screws 107 fastening the housing to machine frame 2*a* (see Figures 3 to 7, inclusive). Also secured to frame 2*a* by means of screws 109 is a bracket 110 having a bearing 111 in which is journalled a shaft 112. Secured to one end of shaft 112 is a crank arm 113 while at the other end is fixed a lever 114 provided with a cam follower 115. Crank 113 is connected to a link 116.

Figures 4, 5, 6, 7:
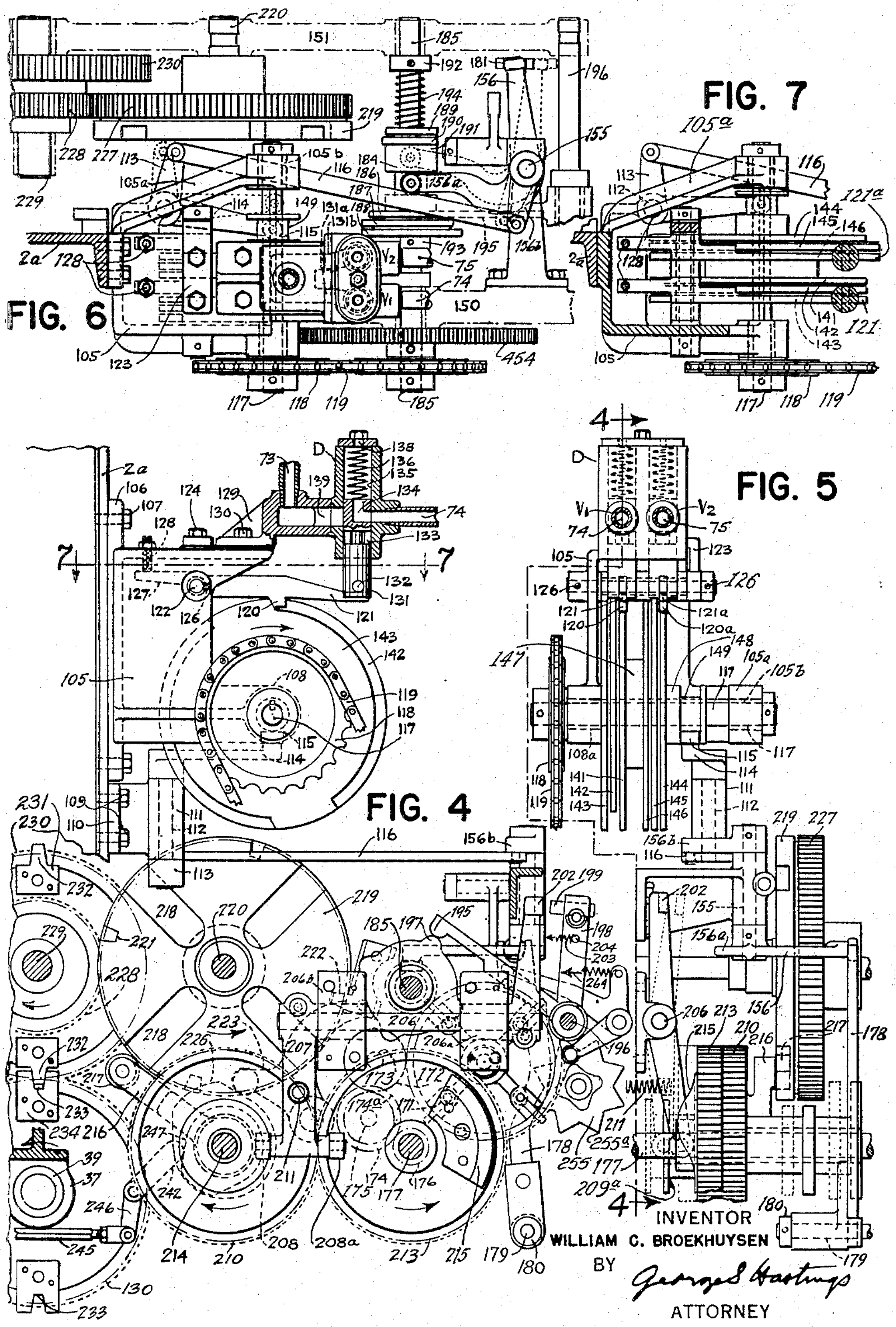
Figure 4 is a side elevation partly in section, taken on line 4—4 of Figure 5 showing a preferred form of control mechanism, the frame being omitted for sake of clearness.
Figure 5 is an end elevation of Figure 4.
Figure 6 is a plan view of Figure 4.
Figure 7 is a sectional plan view on line 7—7 of Figure 4 showing the suction valve control mechanism.

Also forming a part of housing 105 is an arm 105*a* provided with a journal 105*b* (Figure 6). A shaft 117 is journalled in journal 108*a* of projection 108 formed on housing 105 and in the journal 105*b*. Mounted on shaft 117 is a sprocket 118 which through sprocket chain 119 drives the shaft in the direction indicated in Figure 4. Levers 121 and 121*a* are journalled on shaft 122 mounted in housing 105 and bracket 123 secured to housing 105 by screws 124. Shaft 122 is fixed in housing 105 by a set screw 126. Levers 121 and 121*a* are provided with portions 127 arranged to engage with adjustably mounted set screws 128 mounted in housing 105 and thereby control the downward movement of the levers.

The suction control mechanism may consist of a double valve device, designated generally D (Figures 1, 4, 5 and 6) having a bracket portion 129 mounted upon housing 105 by means of screws 130. Two valves $V_1$ and $V_2$ are provided, for reasons described hereinafter, and since the construction is identical it will suffice to describe one in detail. Valves $V_1$ and $V_2$ are arranged side by side and in the illustrated embodiment are formed in a single unit. Slidably mounted in each of the valves is a piston member 131, having a slotted lower end and a pin 132 resting on the end of lever 121 or 121A. Piston member 131 is provided with a reduced portion 133 approximately midway of its length, and at its free end has a substantially L-shaped bore 134. The piston is slidably movable in bore 135 formed in each valve device. A spring 136 bears against and tends to urge each piston 131 into suction cut-off position in which the reduced portion 133 lies out of alignment with bore 139 so that L-shaped bore 134 connects opening 138, and pipe 74, and the tail 127 of lever 121 or 121A rests against set screw 128 thus preventing excess downward movement of lever 121 or 121A. In this position (see Figure 4) all suction through conduit 74 is cut off.

Cam follower 120 on lever 121 or 121A is provided for tracking cams which are moved into cooperating position therewith as described hereinafter. In this manner lever 121 or 121A is raised against the compression of spring 136, reduced piston portion 133 is aligned with bore 139 and pipe 74, suction flows from conduit 73 to pipe 74 and thereby enters either the pin setter or the pin respotting system, and either one or the other, respectively, is made active for gripping and handling pins, as pointed out above. As stated, valves $V_1$ and $V_2$ are identical in construction and operation although they are operated in different timed relation, as will be made evident hereinafter. A single source of suction 73 feeds both valves. A bore 131a connects valve $V_1$ and a similar bore 131b connects valve $V_2$ with the source of suction.

The operation of valves $V_1$ and $V_2$ is controlled by a series of cams slidably mounted on and rotating with shaft 117. As shown in Figures 4, 5, 6 and 7, cams 141, 142 and 143 coact with cam follower projection 120 on valve lever 121, and cams 144, 145 and 146 cooperate with projection 120a on valve lever 121a to open and close these valves. The cams may all be formed as an integral unit or connected together (as shown, secured to a disk 147, and mounted for sliding movement as a unit on shaft 117). Fixed to cam 144 is a hub 148 having a reduced portion 149 engaged by cam follower 115 carried by lever 114 so that whenever this lever is rocked, the cams will be shifted along shaft 117.

Figures 8, 9:
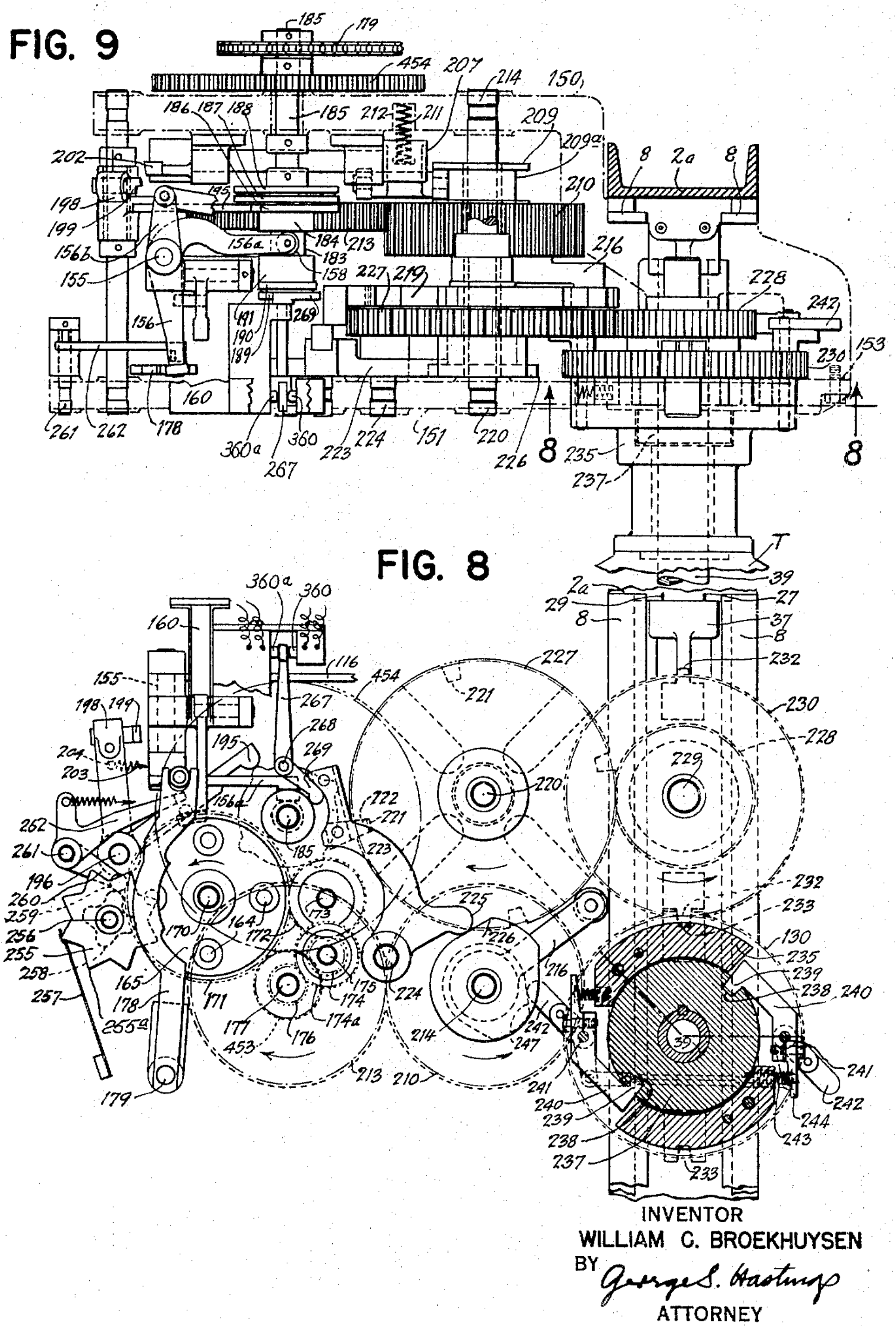
Figure 8 is a side sectional elevation of the mechanism of Figure 9 showing in section taken along line 8—8 construction of the index locking mechanism and its connection to the pin setter table.
Figure 9 is a plan view of Figure 8.

Mounted on frame 2 are other elements of the control mechanism in which the several stationary shafts thereof are fixed in spaced frame members 150 and 151 secured to the frame 2 and to each other at 153 (Figure 9).

Figures 10, 11, 12, 13:
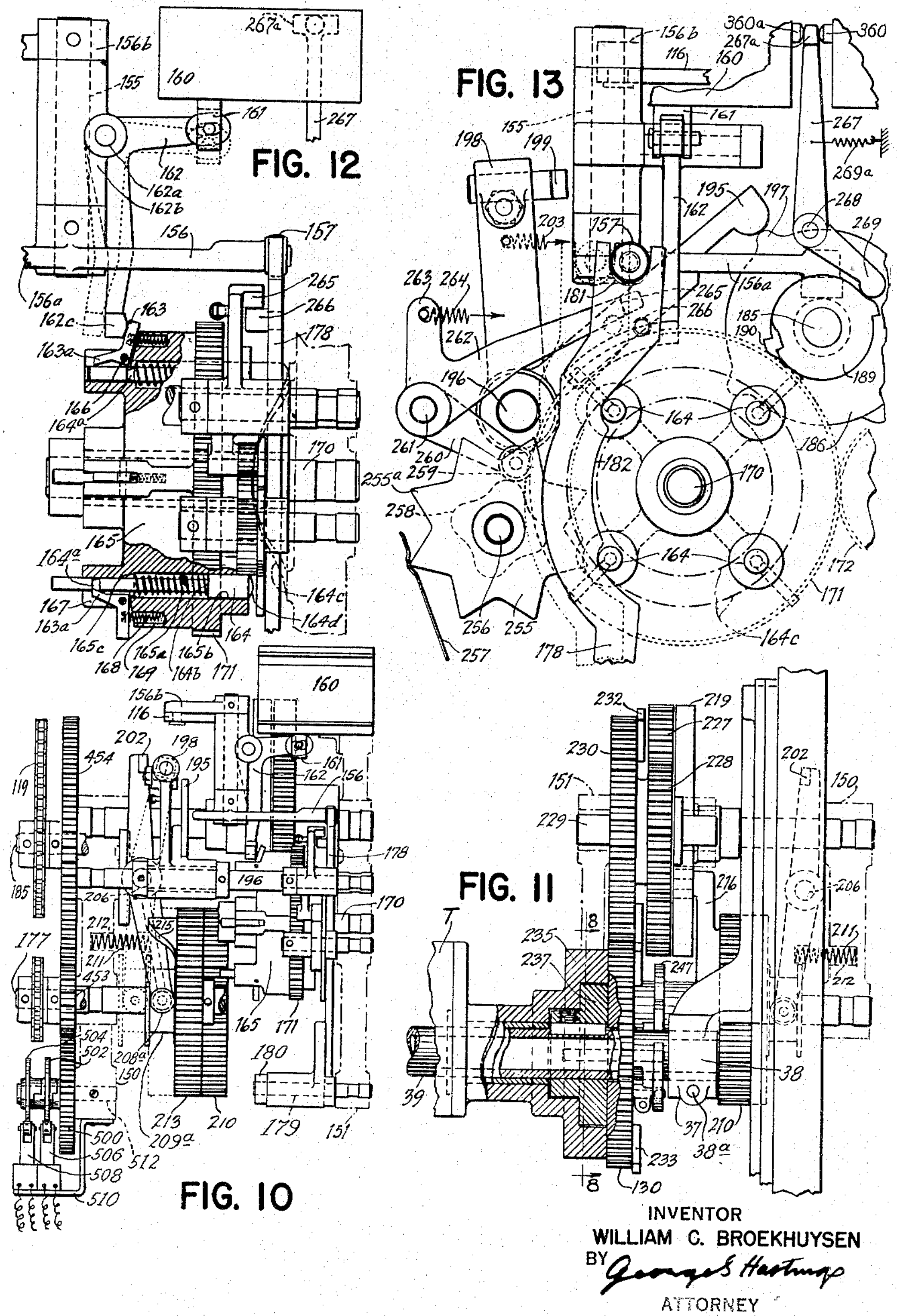
Figure 10 is a rear view of the control mechanism shown in Figure 8.
Figure 11 is a front view of the indexing mechanism, partly in section showing the connections between the pin setter table and the indexing device.
Figure 12 is an enlarged view, partly in section, of parts shown in Figure 10.
Figure 13 is a side elevation of Figure 12.
Figures 14, 15, 16:
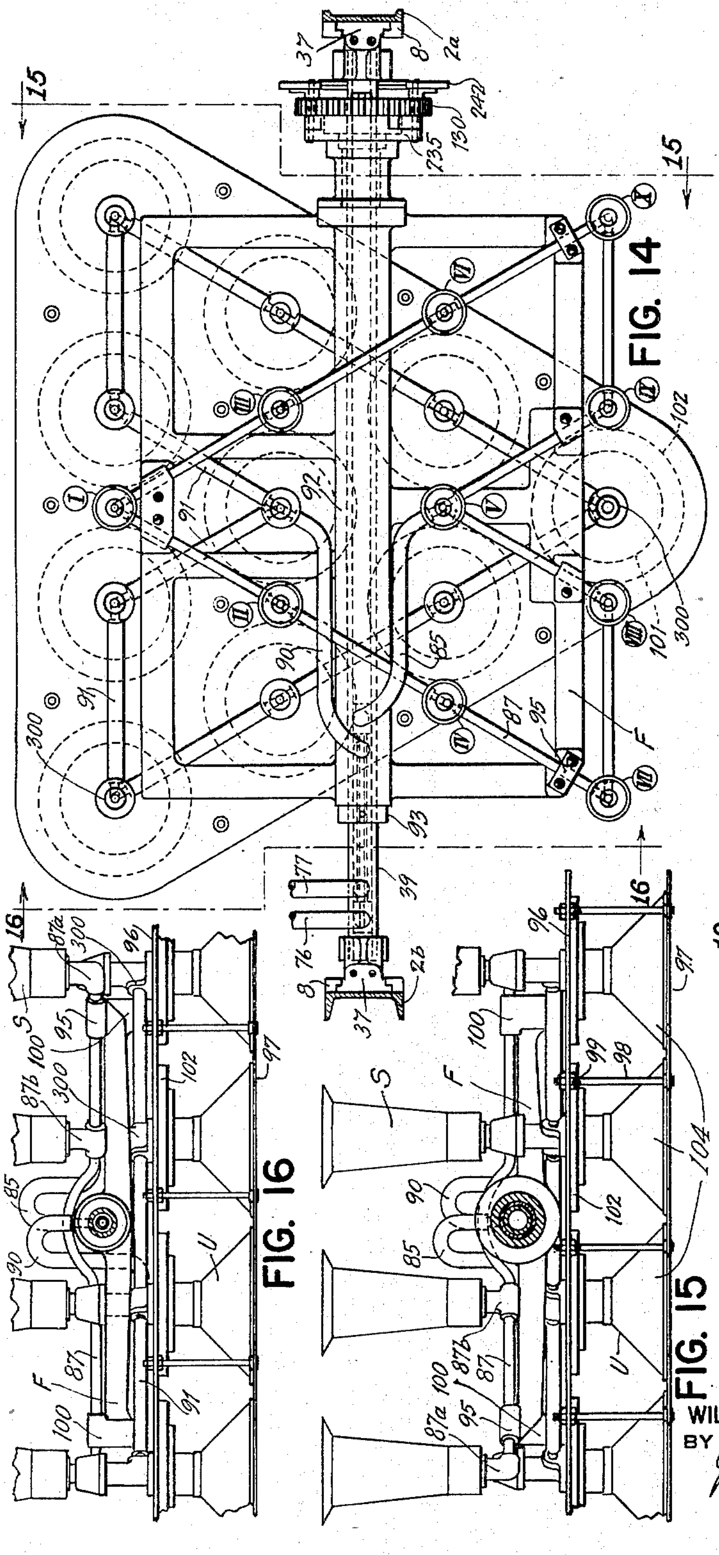
Figure 14 is a plan view of the pin setter table showing suction connections to the spotter and respotter funnels.
Figure 15 is a sectional elevation on line 15—15 of Figure 14.
Figure 16 is a sectional elevation on line 16—16 of Figure 14.

The mechanism for indexing the pin setter table is the same as that disclosed in said Nejedly patent. Referring to Figure 12, it will be seen that a solenoid 160 mounted on frame 151 (Figure 10) is provided with an armature 161 connected to a bell crank lever 162 pivotally mounted at 162a in a bracket 162b in which is also mounted shaft 155 to which lever 156 is attached. Lever 156 is provided with an arm 156a, and to the upper end of shaft 155 is attached an arm 156b. Arm 156b is pivotally connected to link 116 (Figure 6). The free end of lever 162 is provided with a trigger or hammer portion 162c movable by operation of solenoid 160 into engagement with latches 163 mounted about a turret 165. These latches cooperate in holding the pins 164 in inoperative position. From a reference to Figures 12 and 13, it will be seen that solenoid 160 has been energized whereupon armature 161 has moved lever 162 from its normally inoperative position, as shown in dotted lines in Figure 12, to its latch engaging, or full line position, where impact arm or hammer 162c has engaged a latch 163; hence under such conditions the latch is tripped, and the pin 164 under its control is released. Turret 165 carries a plurality of pins 164 spaced ninety degrees apart, as shown in Figure 13. Each of the pins is slidably mounted and normally spring urged into operative position. Each pin is also provided with a reduced portion 164a adapted to be engaged by tail 163a of latch 163 for locking the pin in inoperative position. As shown in detail in Figure 12, each pin 164 is slidably mounted in bores 165b formed in the turret 165, and encircling each pin is a spring 165a, one end of which engages a shoulder 164b of pin head 164d while the other end of the spring bears against a shoulder 165c of the bore 165b.

The several latches are pivotally mounted at 166 in grooves or slots 167 formed in the turret. Springs 168 located in bores 169 formed in the turret 165 urge latches 163 into latching position as the pin 164 is pushed in when the pin head 164d rides on cam 164c.

Turret 165, which is responsible for the operation of the strike control mechanism of the machine, is loosely mounted on shaft 170, and has either formed integrally therewith or suitably attached thereto a gear 171 which is driven by gear 172 mounted on shaft 173 meshing with and driven by gear 174 on shaft 175. A gear 174a, also mounted on shaft 175, meshes with and is driven by gear 176 on shaft 177. Shaft 177 is driven from sprocket 450 on the main drive shaft 49 through chain 451 and sprocket 452 on shaft 177. Pinion 453 on shaft 177 meshes with gear 454 on shaft 185 on which are mounted the several cams (186 to 191, inclusive) which control the various operations as will be hereinafter described.

Referring to Figure 13, it will be seen that in its counterclockwise movement, each pin 164, if and when released from a latch 163, becomes operative approximately forty-five degrees from the vertical, at which time it engages cam surface 182 of a lever 178, hereinafter described more in detail. It is also to be noted that as the turret is rotated step by step through 90° in each cycle of the machine during which time shafts 6 and 53 make one and two revolutions, respectively, each of the pins 164 will be moved past hammer or trigger head 162c and if the pin is not released by the striking impact of the hammer with its locking latch 163 because the hammer 162c is not operated to unlatch it, the pin cannot project from the turret, as shown in Figure 12, and hence cannot engage cam portion 182, as above mentioned, and operate the strike control mechanism.

Whenever turret 165 conveys any of the pins 164 past trigger 162c, and a particular pin is released from a particular latch, that pin will operate in the manner above described. That is, when a pin 164 is unlatched, spring 165a, which abuts against shoulder 164b, forces the pin to the right (Figure 12) and the strike control mechanism will be rendered operative.

Lever 178 is pivotally mounted on shaft 179 fixed in frame 151. A collar 180 pinned to shaft 179 limits the lever against lateral movement. Lever 178 in addition to the cam 182, substantially midway of its length, is also provided with a yoke 181 at its free end in which rides a roller 157 carried on the end of lever 156. In this manner whenever lever 178 is rocked about its pivot because of its engagement with a pin 164, link 116 rocks lever 113, which shifts collar 148 and its associated cams along shaft 117. Arm 156a of lever 156 is provided with a cam follower 158 which rides in a groove 183 formed in member 184 slidably mounted on shaft 185. Attached to or formed integrally with slide member 184 are cams 186, 187 and 188 on one side of groove 183, while cams 189, 190 and 191, the last of which is a blank, are located on the other side. Spring 194, which encircles shaft 185, bears against collar 192 fixed to shaft 185 and urges member 184 against collar 193 also pinned to shaft 185.

When the lever 178 is moved by a selected pin 164, it causes yoke 181 to rock arm 156 which controls the movement of the strike and spare cams. Hence, if there is a full stroke of lever 156 (from full-time-line to dotted-line position, Figures 6 and 13), the movement of member 184 along the shaft 185 will position cam 188 in the path of a lever 195 mounted on shaft 196 for engagement by the bumps 197 of cam 188 for indexing the pin setter table T through one-half of a revolution.

When a bump 197 engages with lever 195 it swings a lever 198, fast on shaft 196, and provided with a locking nose 199 out of locking engagement with lever 202. A spring 203, one end of which is secured at 204 to the lever 198 and the other end of which is suitably connected to the frame, normally urges lever 198 into locking engagement with lever 202.

Lever 202 is mounted on one end of a shaft 206, which is journalled in brackets 206*a* and 206*b* suitably secured to frame 150 of the indexing mechanism. At the other end of shaft 206 is mounted a lever 207, provided with cam followers 208 and 208*a*. Cam follower 208 runs in a groove 209*a* in member 209 formed integrally with or suitably attached to gear 210 which is slidably and rotatably mounted on a fixed shaft 214. A spring 211 located in a recess 212 in frame 150 bears against lever 207 so that whenever lever 202 is released from locking engagement with lever 198, the spring 211 forces gear 210, which meshes with gear 213 fixed to shaft 177, to slide along shaft 214.

Fastened to or formed integrally with gear 210 is an arm 216 provided with a cam follower 217 arranged to engage slots 218 in a Geneva gear 219 rotatably mounted on shaft 220 whenever lever 207 is rocked by shaft 206 to slide arm 216 into engagement with Geneva gear 219 whereupon cam follower 217 carried by arm 216 is positioned to engage one of the slots 218 in Geneva gear 219. As shown, slots 218 are spaced 90° apart so that every time the cam follower 217 engages in a slot 218, the Geneva gear will be indexed through 90°. Spaced 90° apart about the periphery of Geneva gear 219 and between slots 218 are apertures 221 into which fits a projection 222 mounted on a lever 223 pivoted at 224 and provided with a cam follower 225 tracking a cam 226 mounted on the hub of arm 216. In this summer, after each indexing movement of arm 216, projection 222 will be brought into engagement with an aperture 221 to lock the Geneva gear 219 against overrun.

Attached to or formed integrally with Geneva gear 219 is a gear 227, which meshes with and drives gear 228 mounted on shaft 229 journalled in side frames 150 and 151. The gear ratio between gears 227 and 228 is one to two (1:2), so that for every 90° of movement of gear 227, gear 228 is rotated through 180° thereby turning table T through 180°. At the conclusion of the indexing operation, a cam 215 mounted on the face of gear 213 engages cam follower 208*a* on lever 207 and swings lever 207 outwardly causing cam follower 208, also mounted on lever 207, to slide gear 210 on shaft 214 thereby disconnecting cam follower 217 from Geneva slot 218, whereupon cam follower 225 riding on cam 226 locks shaft 220 against further rotation because of the engagement of projection 222 with aperture 221 (see Figures 4 and 8). Also mounted on shaft 229 and either formed integrally with or attached to gear 228 is a gear 230. Fixed at 180° intervals adjacent the periphery of gear 230 and on the face thereof are plates 231 provided with projections 232. These projections are positioned to engage with cut-out portions or apertures 233 formed in plates 234 fixed to the face of a gear 130 mounted on hub 235 of table T.

From the above it follows that setter table T, which is mounted on shaft 39 supported by slide brackets 37 running in guides 8, will be in position to be turned on shaft 39 through 180° whenever one of the projections 232 carried by gear 230 is in engagement with an aperture 233 carried by gear 130 (Figure 4).

Setter table T is provided at one end (see Figures 2, 9 and 14) with a hub 235 so that whenever gear 130 is rotated through 180°, setter table T also will rotate a similar amount. In order to lock the table against possible rotation during the upward and downward movements, there has been provided a latch and thrust collar 237 between hub 235 and one face of gear 130, Figure 8; this collar is keyed to shaft 39 and is provided with openings 238 in which fit noses 239 formed on latches 240 which are pivotally mounted on short shafts 241 carried by gear 130 and hub 235. In the present embodiment two latches spaced 180° apart are employed, thereby making it certain that the table will be unlocked for indexing at the proper time. Each latch is furnished with a control arm 242 and springs 243 cooperate with tails 244 formed on the latches to maintain noses 239 in locking engagement with openings 238. An adjustable link 245 connects levers 246 attached to shafts 241 so that whenever one latch 240 is moved out of engagement with collar 237, the other also will be moved. Mounted on the hub of arm 216, adjacent cam 226, is a cam 247 positioned to engage the control arms 242 of latches 240 so that whenever lever 216 moves to drive Geneva gear 219, the high portion of cam 247 engages one of the arms 242 of latches 240 and thereby unlocks gear 130 and hub 235 from collar 237 so that setter table T can be indexed the desired amount, in this case, 180°. It will be observed that gear 130 is so mounted that the setter table can be raised and lowered and also inverted in proper timed relation to the control mechanism. This arrangement also makes it possible to index the table in one direction.

Loosely mounted on shaft 256 is a star wheel 255 provided with a plurality of projections 255*a* positioned in the path of pins 164 on turret 165 so that during the rotation of the turret, whenever a pin 164 projects therefrom, the pin in addition to engaging cam surface 182 of lever 178 will also engage one of the projections 255*a* and turn star wheel 255 through one step, the magnitude of which depends upon the number of projections 255*a*. In the present embodiment there are eight projections 255*a* and the star wheel is indexed 45°. A flat spring 257 bears against the periphery of star wheel 255 and prevents excess movement thereof under the influence of pins 164.

Fixed to wheel 255 is a cam 258 provided with alternate high and low portions, and so arranged that whenever star wheel 255 is indexed, cam 258 will also move through a given angle. Tracking on cam 258 is a cam follower 259 mounted on lever 260 pivoted on shaft 261. Lever 260 is also provided with arms 262 and 263, and to arm 263 is fastened one end of spring 264, the other end of which is suitably secured to a stationary part of the machine. Spring 264 maintains cam follower 259 in tracking engagement with cam 258. On the free end of arm 262 there is provided a projection 265 arranged to be moved into and out of the path of a pin 266 mounted on and projecting laterally from lever 178. The arrangement of this mechanism is such that whenever lever 178 is moving on its return stroke under the action of spring 194 after having been moved outwardly by a pin 164, if cam follower 259 is running on a high part of cam 258, projection 265 will be clear of pin 266, but if cam follower 259 is positioned on a low part of cam 258 then projection 265 will be in the path of pin 266 and hence will lock lever 178 against full return movement.

*Operation of control mechanism—normal play*

It will be understood from the above that the lever 178 is responsible for the positioning of the cam unit 186 to 191 and of the cam unit 141 to 146. Whenever the shaft 177 is being driven and the solenoid 160 is energized, a projected pin 164 will move the lever 178 and the cam 188 will be positioned to engage the lever 195, and at the proper time will set into operation the mechanism for indexing the table T. When the lever 178 returns the full distance to its original position, the cam 186 will be located for engagement with the lever 195 to control the indexing of the table at a different time. If, however, lever 178 is held in its intermediate position, the cam 187 will engage the lever 195 to control the indexing of the table in a similar manner to the cam 186 but in a different time relation. The cams 141—143 and 144—146 will be similarly selectively positioned with respect to the levers 121 and 121*a* to control the application of suction to the setting and resetting devices in different ways depending upon which of the cams 186—188 is in controlling position. Each of the pins 164 after being projected, is returned to its latched position during rotation of the turret 165, by engagement with a stationary cam 164*c* on the frame 151 (Figure 12).

Figures 24 to 27 show the cams of the two cam units in expanded form. The cam 188 is the strike control cam, as it controls when a strike has been made, that is, all of the pins have been knocked down by the first ball thrown in any frame. It is provided with four equally spaced apart bumps 197, marked 1, 2, 3 and 4 in Figure 26, of which the bumps 1 and 2 constitute an active set which may be effective in one cycle of the machine, and the bumps 3 and 4 constitute another active set which may be effective in another cycle of the machine, the cam unit turning through a half revolution in each cycle. The cams 186 and 187 may be termed the second ball, and spare control cams, as one or the other of them controls when a strike has not been made, that is, when pins remain standing after the first ball has been thrown. Each of these cams is provided with two bumps, but they are arranged on different portions of the cams, the bumps 1A and 2A of cam 187 being in the same positions as the bumps 1 and 2 of the cam 188, and the bumps 3A and 4A of the cam 186 being in the same positions as the bumps 3 and 4 of the cam 188. The cams 186 and 187 are thus of the same form, but off-set in 180° relation one to the other. The particular cam 186 or 187 which is to be in controlling position with respect to lever 195 is determined by the cam 258 of the star wheel 255, which as above described, either permits or prevents the full return movement of the lever 178. In the former case, the cam 186 is moved into controlling position, and in the latter case, the cam 187 is moved into controlling position.

The reason for this will be apparent when it is considered that the first ball thrown at the start of a game may or may not result in a strike. In the former case, a new set of pins must be set on the alley bed in the first cycle of the machine or after the first ball of a frame is thrown, and by the energization of the solenoid 160 in a manner later described, a pin 164 is projected into operative position and the lever 178 is operated as above described to bring the cam 188 into controlling position and the bumps 1 and 2 thereof will cause the indexing or turning of the table T prior to the downward pin setting movement thereof and after the return upward movement, by the mechanism and in the manner above set forth. In the latter case, in which the pins are not all knocked down, the solenoid 160 is not energized, the lever 178 is not operated, and assuming the roller 259 is engaging a high point of the cam 258, the cam 186 will remain in controlling position. Consequently no indexing movements are imparted to the table T during the first cycle of operation, as the lever 195 rides on the surface of cam 186, and the standing pins are raised and reset on the alley bed by upward and downward movements of the table during this cycle. After the second ball is thrown, in a two ball per frame game, regardless of whether the standing pins have been knocked down or not, a new set of pins must be placed on the alley bed during the second cycle of operation. Again the solenoid 160 is not energized, and the cam 186 remains in control, and during this second cycle the bumps 3A and 4A cause indexing or turning of the table T in the same manner as the bumps 1 and 2 of the cam 188. The cam unit having completed a revolution is restored to the original position, ready for like eventualities to those described, in the next frame.

If a strike is made in the next frame following a strike in the first frame, the cam unit will have made half a revolution, and will make another half revolution in the single cycle of the first and only ball of the second (strike) frame. The solenoid 160 will be energized and the cam 188 moved into controlling position as in the case of the first strike, but the second half of the cam will be active and the bumps 3 and 4 thereof will cause indexing of the table T for the setting of a new group of pins, in the same manner as the bumps 1 and 2. The cam unit is then restored to its original position at the end of the second frame, ready for like eventualities to those described with respect to the first frame, in the next or third frame of the game.

It will be understood that in the single strike cycle of the first frame, the roller 259 will move onto a low portion of the cam 258, and the lever 178 because of the engagement of projection 265 by pin 266 on lever 178 will not complete a full return stroke. This will be of no effect in the case of a second strike cycle in the second frame, as the lever 178 will be operated by the projected pin 164 to bring the cam 188 into controlling position, as described, and during this cycle the roller 259 will again be engaged with a high portion of cam 258.

If however, following a strike in the first frame, the first ball of the next frame does not result in a strike, it will be necessary to cause operation of the machine through two successive cycles, as described above in the case where a strike did not result in the first frame. It will be seen that if the cam 186 was still in controlling position, it would cause incorrect operation of the machine, as at the end of the first strike cycle, the lever 195 would be in engagement with the second half of the cam 186 instead of the first half thereof, due to the half revolution of the cam unit. It is for this reason that the cam 258 is provided to cause the lever 178 to be held in an intermediate position, due to which the cam 187 is in controlling position. As this cam is a duplicate of the cam 186 but displaced 180° with respect thereto, it will correctly control the operation in the same manner as described with respect to the cam 186, the bumps 1A and 2A being active in the second cycle to cause the setting of a new set of pins for the third frame. In the case of a strike in the third frame, following a non-strike in the second frame, the cam 258 will again operate to bring the cam 186 back into controlling position at the start of the fourth frame.

It will be understood that in the case of a sucesssion of strikes, the cam 188 will control, alternate halves of the cam being active in alternate single strike cycles. In the case of a succession of non-strikes or spares, the cam 186 or 187 will remain in control, depending on which was in controlling position at the start of the succession, and until a strike is made and the other cam is brought into controlling position, the lever 178 only being operated when a strike is made and the solenoid 160 is energized.

Figures 24, 25, 26, 27, 28, 29, 30, 31, 32:
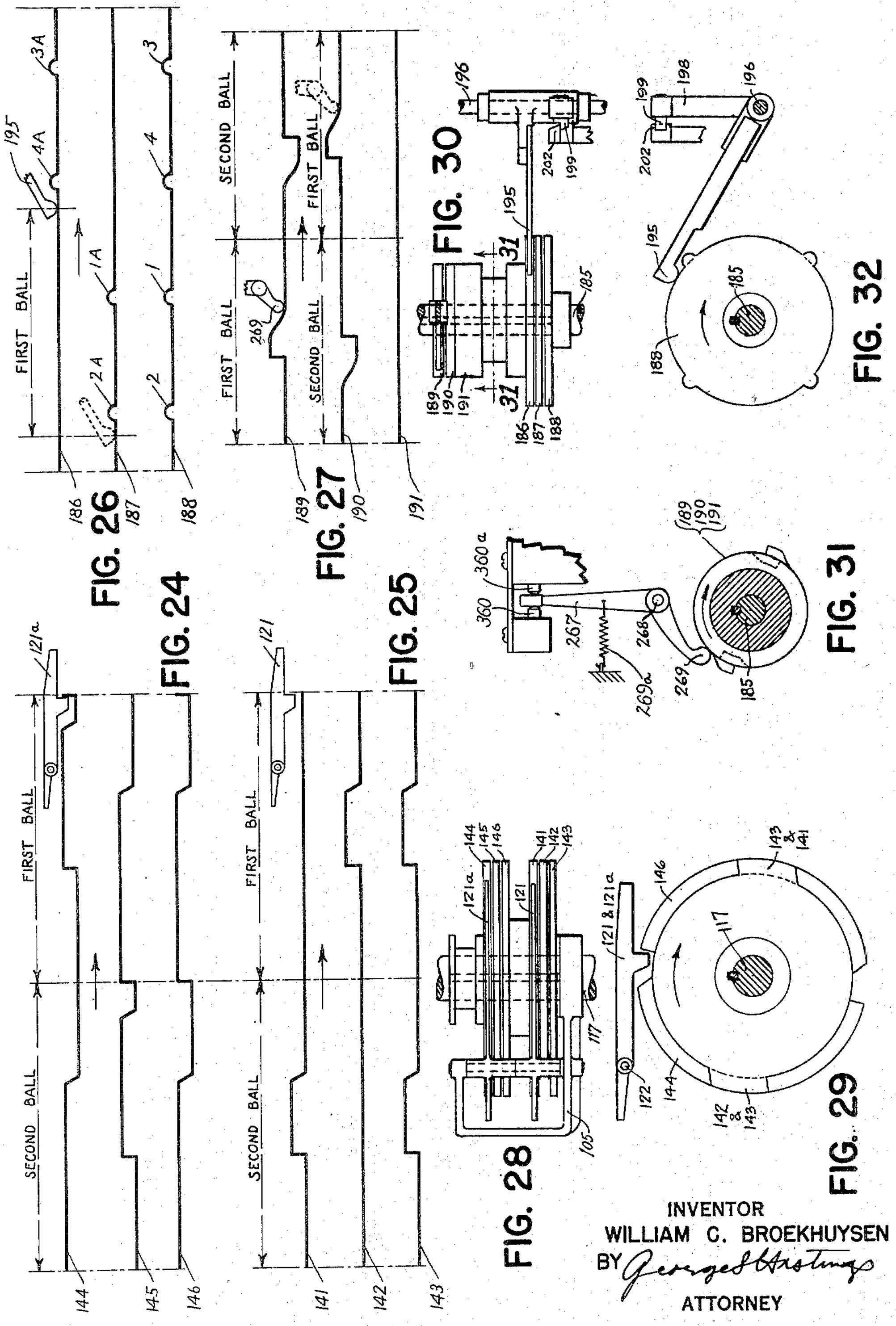
Figure 24 is a development of suction cams for the respotter units.
Figure 25 is a development of the suction control cams for the pin setting units on the table.
Figure 26 is a development of cams for indexing the pin setter table.
Figure 27 is a development of cams for strike control circuit breaker and spare control mechanisms.
Figure 28 is a plan view of the spotter and respotter cams.
Figure 29 is a side elevation of Figure 28.
Figure 30 is a plan view of the cams for indexing the pin setter table.
Figure 31 is a sectional elevation on line 31—31 of Figure 30.
Figure 32 is a side elevation of Figure 31.

With respect to the cam unit 141—146, Figures 24 and 25, it will be understood that as this unit is shifted when the cam unit 186 to 191 is shifted, the cams 143 and 146 will be brought into controlling positions when the cam 188 is in controlling position. The two halves of each cam are duplicates of each other, this cam unit also making a half revolution in each machine cycle. Each half of cam 143 is provided with a high cam portion arranged to operate the lever 121 to cause suction to be applied to the pin setting devices S, as above described, prior to the first indexing movement of the table T and until the pins are set on the alley bed by the downward movement of the table, the lever 121 then moving onto a low portion of the cam to cut off the suction and release the pins. Each half of cam 146 is provided with a high cam portion arranged to operate lever 121*a* to cause suction to be applied to the pin resetting devices U prior to the first indexing movement of the table T and until after the second indexing movement has been completed, the lever 121*a* then passing onto a low portion of the cam to cut off the suction. The purpose of this is to hold the resetting devices against lateral movement during said inverting movements, as will be described with reference to Figure 20.

It will be understood that the levers 121 and 121*a* will be in engagement with the cams 141 and 144 when the lever 195 is in engagement with the cam 186, and it will appear from the later description that during each cycle of the machine, the table is twice moved downwardly and upwardly. The first downward movement is for the purpose of detecting the presence or absence of standing pins, as described in the Nejedly patent. If a strike has been made and there are no standing pins, the solenoid 160 is energized and the cams 143 and 146 are brought into engagement with the levers 121 and 121*a* to control the application of suction to the setting and resetting devices in the manner above set forth, in proper relation with respect to the second downward and upward movements of the table T.

If however, there are pins still standing on the alley bed, the solenoid 160 will not be energized and the cams 141 and 144 will remain in controlling positions. The first half of cam 144 is provided with a high cam portion adapted to operate the lever 121*a* to cause suction to be applied to the resetting devices U at the end of the first downward movement and until the end of the second downward movement, in order that the standing pins may be raised from the bed by the first upward movement of the table and reset on the bed by the second downward movement thereof, the lever 121*a* then passing onto a low portion of the cam to cut off the suction and release the pins. During this cycle of the machine, suction is not applied to the setting devices S, the lever 121 running on a low portion of the cam 141.

During the second cycle of operation suction is not applied in the resetting devices during the first upward movement, as although pins may still be standing, it is not required to lift and reset the same in a two ball per frame game, but a new set of pins must be set upon the alley bed. Consequently the second halves of the cams 141 and 144 are respectively the same as the halves of the cams 143 and 146, in order to operate the levers 121 and 121*a* to cause suction to be applied in the setting and resetting devices during the indexing and vertical movements of the table T, in the same manner as when the levers are controlled by the cams 143 and 146.

The cams 142 and 145 are respectively duplicates of the cams 141 and 144, but are displaced 180° with respect thereto, these cams being moved into controlling positions with respect to levers 121 and 121*a*, when the cam 187 is moved into controlling position with respect to lever 195, the cams 141, 142 and 144, 145 being provided for the same reasons as above set forth in regard to the cams 186, 187.

*Operation of control mechanism as the result of a foul*

If a foul is made on the first ball of a frame, and regardless of whether all pins are knocked down, or some pins remain standing, the pin setting control mechanism is actuated to place a new set of pins on the alley. In such case a foul signal, such as a light or a bell or both, is operated to apprise the player that he has fouled; the resetter units U are rendered inoperative to lift pins, as described hereinafter; and sweep 400 is operated to remove all deadwood.

The operation of the control mechanism is substantially the same as that described above in connection with a strike. That is, solenoid 160 is energized, and a projected pin 164 will move lever 178, and cam 188 will be positioned to engage lever 195, and at the proper time will set into operation the mechanism for indexing table T even though there still remains a second ball of the same frame to be played. Because of the foul, no score for the first ball is counted. By means of the mechanism described hereinafter resetter units U are rendered inoperative because of the operation of solenoid 550 which operates valve 705 and cuts off the supply of suction to resetter units U from conduit 707.

If a foul is made on the second or last ball of a frame the machine continues in its normal operation, except that a signal such as a light L is operated to inform the player that he has made a foul.

Figure 20:
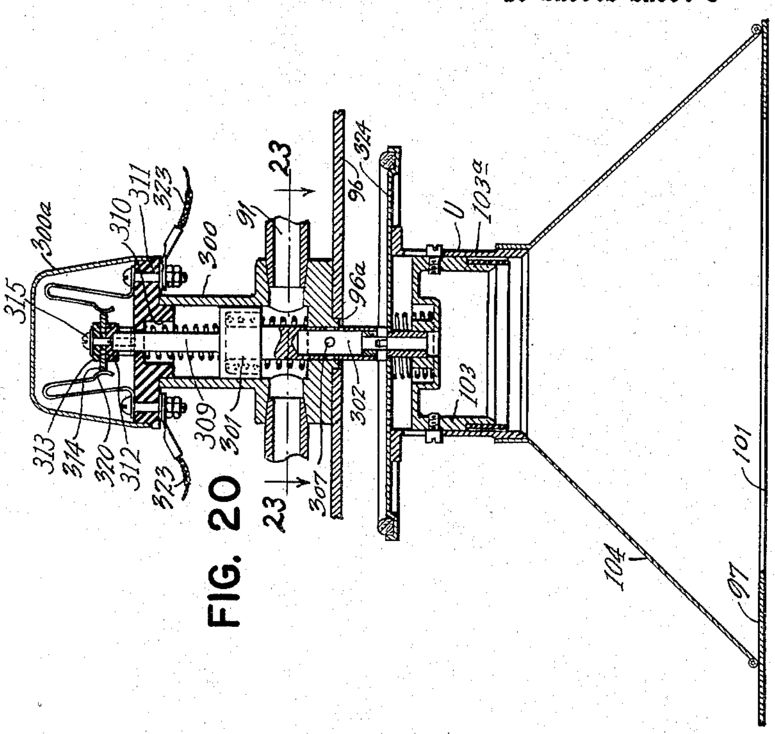
Figure 20 is a sectional view showing a respotter unit resting on the bottom shelf of the table, the suction turned on bringing the valve stem down to hold the respotter secure while the table is rotated 180°.
Figure 22:
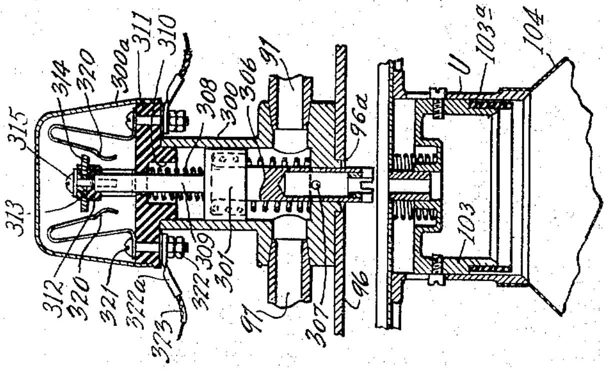
Figure 22 is a partial sectional view showing the suction valve in a neutral position.
Figure 21:
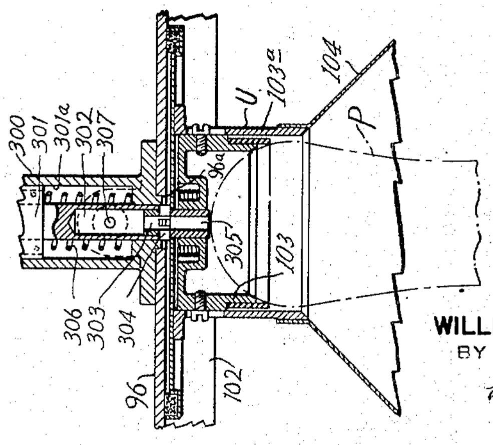
Figure 21 is a sectional view showing the same respotter when raised by the pin and sealed against the top plate of the table and the valve piston forced up so as to lead suction into the valve to hold the pin and funnel secure to the table.

Figures 20, 21 and 22 show the detailed construction of the resetter units U which conform generally in construction to those shown in the Nejedly patent mentioned hereinabove. The resetter units are each provided with means for conducting suction, and also means for automatically registering the presence or absence of a standing pin, and therefore, control the operation of the machine to effect the movement of pins to the setters S. Since all of the pin resetter units are the same, only one will be described in detail. In the preferred form a tubular bracket 300 is fixedly mounted upon plate 96 in centered relation with reference to an opening 96*a* therein, and in proper arrangement with respect to the required position of the pins as set and reset upon the alley, in usual triangular formation or other desired arrangement. A piston 301 is slidably mounted in the bore 301*a* of the bracket, and has associated therewith and fixed thereto a valve 302 provided with a bore 303 having a transverse suction distributing slot 304 in the free end thereof so that suction may be distributed to the pin resetter unit. Suction is conducted from bore 303 through a bore 305 in each resetter unit which communicates with the space above the center of a pin. Coiled about the valve 302 is a spring 306 which bears against the piston and normally tends to urge it upwardly as shown in Figure 21. A suction opening 307 is formed in the bore in order to make it possible for suction to be fed from conduit 91 and hence through the bores 303 and 305 for gripping pins. In Figure 21 the suction opening 307 is shown aligned with conduit 91 so that suction is being conducted causing the respotter to grip a pin. Projecting from the upper face of piston 301 is a rod 309 about which is coiled a spring 308 bearing against the upper face of the piston and tending to push it downwardly against the pressure of spring 306. Rod 309 extends upwardly through opening 310 in insulating plug 311 which is secured in the open end of bracket 300. Mounted on rod 309 are insulating plugs 312 and 313 between which is located a conductor disk 314 held thereon by means of a screw 315. Disk 314 is adapted to engage spring contacts 320 which are fixed to insulating plug 311 by means of bolts 321 and nuts 322 which also secure terminal lugs 322*a* of line 323. It will be noted that in Figure 20, disk 314 is shown as closing a circuit through spring contacts 320 and wires 323 as the result of the operation of the suction control which creates suction in the conduits connecting resetter units U, while in Figure 22 the disk is shown in neutral or "circuit open" position. A light cover 300*a* may be provided for protection against dust and injury to the switch unit.

In Figure 20 suction from the line 91 has pulled down piston 301 so that opening 307 is cut off from the source of suction and the pressure of valve 302 bearing against disk 324 is sufficient to hold the unit U against lower plate 97 so that it will not slide between support plates 96 and 97 during the indexing of the table T. In Figure 21, suction opening 307 is aligned with conduit 91, and the suction is conducted through bores 303 and 305 to grip a pin for lifting.

Referring to Figure 35, it will be seen that a switch board 334 of "Bakelite" or any other suitable insulating material is mounted on table T for rotation therewith. This board preferably is semi-circular in form and supports switch contacts 347, 348 which coact with switch contacts 344, 344*a*, respectively, on plate 328, also formed of non-conducting material, fixed to a bracket 236 secured to shaft 39 by means of clamp screws 236*a*. Also mounted on bracket 236 is a plate 343 of non-conducting material provided with switch contacts 345, 345*a* which coact with contacts 346*a*, 329, respectively, fixed to plate 346 formed of a suitable non-conducting material. Plate 346 is mounted on side frame 2*b* of the machine. Contacts 347 and 348 are connected in a series circuit connecting the several resetter units U. Contacts 344, 344*a* are connected by suitable electric wires to contacts 345, and 345*a*, respectively, which at certain times in the operation of the machine coact with contacts 346*a*, 329, respectively, connected to wires forming part of the strike control mechanism. The arrangement of this mechanism, as in the Nejedly patent referred to hereinabove, is such that table T may be raised, lowered, and turned, and all necessary electrical operations be carried out properly. Consequently, when table T is indexed and lowered towards the alley, switch contacts 345, 346*a* and 345*a*, 329 will be in engagement, and if all pins have been knocked down, or a strike made, a series circuit through units U is completed, and the strike control mechanism operated to effect the delivery of a new set of pins to the alley. As the table is raised, and turned through 180°, the several contacts separate, and the series circuit is broken.

Figures 33, 34:
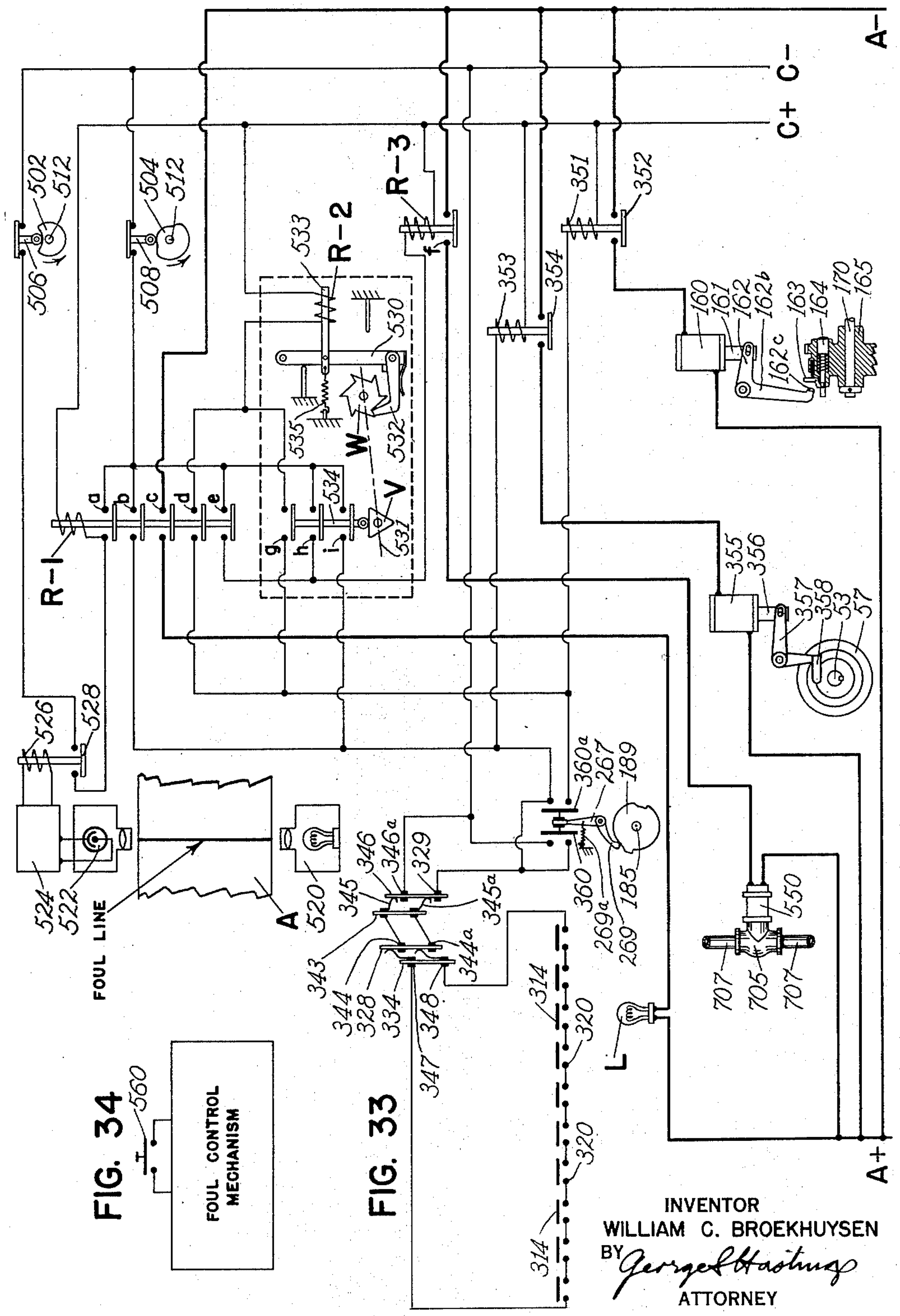
Figure 33 is a suitable wiring diagram showing a circuit including the several control mechanisms necessary for operating the automatic foul detector pin setting control.
Figure 34 is a fragmentary view showing circuit connections which can be used for manual operation of the foul detector pin setting control.

Figure 33 illustrates a suitable wiring diagram showing a foul detector device and an automatic foul control mechanism operating in conjunction with the electric control circuit of the bowling pin setting machine. This figure also shows diagrammatically certain mechanical elements which are included as a part of the control mechanism. The mechanism shown in Figure 33 is operative to change the cycle of the machine to a strike cycle regardless of any standing pins and to reset ten pins if a foul is made on the first ball of a frame. It also functions to incapacitate the resetter units U by shutting off the suction which operates these units and prevent them from lifting and resetting any standing pins so that the sweep 400 may remove them from the alley along with any deadwood if the first ball of a frame is a foul. There is also provided a foul signal such as a light which is turned on automatically to apprise the player that he has made a foul.

The foul control circuit also changes the operation of the machine for the following ball, which is the player's second ball of the same frame, to a strike cycle in the same manner as for a first ball foul but without operating the foul light unless the second ball of the frame should also be a foul in which case the foul light is operated. In the event of a second ball foul following a normal first ball or one free of foul, the cyclic operation of the machine continues normally and a normal second ball cycle occurs with the addition, however, of the operation of the foul signal.

The automatic foul detector device may be of any suitable automatic type, such as a photoelectrically controlled device, such as shown diagrammatically in Figure 33, which preferably is one which meets the approval of the American Bowling Congress. The foul detector device may consist of a photoelectric cell unit 522 operating in conjunction with a source of light 520 positioned directly across the alley in line with the foul line so that any unauthorized movement of the player beyond the foul line results in an actuation of solenoid 526 through the photoelectric control 524 which causes a switch 528 to open or close a circuit. In the circuit shown in Figure 33, switch 528 is operated to close the circuit through the coil of a relay R—1.

The control circuit is provided with two switches 506 and 508, each of which is opened and closed by means of cams 502 and 504, respectively. These cams make one revolution per ball or per cycle and are a part of the electric control of the bowling pin setting machine.

As shown in Figure 10, cams 502, 504 are pivoted on a stud 512 held by a suitable lug of the frame member 150. Cam 504 is formed integrally with cam 502 which in turn is integral with a gear 500 meshing with gear 453 on shaft 177. The gearing is so arranged as to insure that each cam makes one revolution per ball. Switches 506, 508 operated by their respective cams are mounted on a bracket 510 secured to the above mentioned lug on frame member 150. Cam 502 is so formed as to maintain switch 506 closed while the machine is inoperative, but after the machine begins to operate as the result of a ball dropping into the pit, cam 502 rotates and causes switch 506 to open and to close again just before the end of the cycle. Cam 504 is formed to keep switch 508 also closed while the machine is inoperative but as it rotates during the upward motion of the pin setter table T following its first downward movement it causes switch 508 to be opened and remain open until the end of the cycle.

The circuit is also provided with a relay R—1, a relay R—2 and relay R—3. Relay R—1 is provided with normally open contacts *a*, *b*, *c*, *d*, and *e*. Relay R—3 has one normally open contact *f*. Relay R—2 is a ratchet relay of any suitable conventional type which is provided with three contacts *g*, *h* and *i* which open and close on alternate impulses to the coil of the relay. The latter is provided with an arm 530 on which is pivotally mounted a pawl 532 engaging a ratchet W which has twice as many teeth as the number of high points on cam V, mounted on the same shaft 531 as ratchet W, which actuates a switch bar 534 to effect the closing of contacts *g*, *h* and *i* as the result of the engagement of the high points on cam V with a cam follower carried by bar 534. Energization of the coil of relay R—2 causes the armature 533 to be moved to the right in Figure 33 and deenergization of the coil allows spring 535 to pull arm 530 to the left whereby pawl 532 which engages the ratchet W causes it to turn through 60° and thereby turn cam V to either open or close contacts *g*, *h* and *i*.

As mentioned hereinabove, there are also provided a plurality of cams which operate in proper timed relation to control the suction valves of the setting and resetting units. This mechanism includes cams 189, 190 and 191 on slide member 184 mounted for shifting movement upon cam shaft 185 and so arranged as to keep switches 360 and 360*a* (Figure 33) in normally open position.

The arrangement of the bumps and depressions on cams 189, 190 and 191 is such that on the first ball of a frame thrown, cam follower 269 of lever 267 is moved upwardly to effect a closing of switch 360*a*. This operation is timed to take place when the setter table T is in "down" position with the resetter units U located to engage, lift, and reset any pins remaining standing. Cam follower 269 is maintained in engagement with cams 189—191 by means of a spring 269*a* having one end connected to lever 267 and its other end suitably attached to the machine frame. In the normal play of the game any standing pins are lifted, and reset pending delivery of the next ball of the same frame because as described hereinabove, actuation of the pin setting mechanism and delivery of a new set of pins to the alley is prevented until after the last or second ball of the frame is thrown. However, if the first ball of a frame results in a strike, closing of switch 360*a* results in the completion of a circuit through resetter unit switches 320 (which at this time are closed by the operation of the suction system described hereinabove) and through the sliding contacts on plates 334, 328, 343 and 346. This energizes relay 351 which closes switch 352 and energizes solenoid 160 to effect the actuation of the pin setting mechanism as set forth hereinabove. Relay 353 is also energized as soon as switches 320 close, and closes switch 354 energizing solenoid 355 causing ten new pins to be transferred from magazine M to setters S for placement on alley A.

A different situation obtains if the player fouls while rolling the first ball of a frame. In that case, regardless of whether any or all pins are knocked down and whether any or all switches 320 are closed when switch 360*a* closes, all pins, whether standing or fallen are swept into the pit, and a new set of pins is delivered to the alley pending playing of the second ball. The machine operates in the same manner as if a strike had been made as far as setting a new set of pins is concerned although the mechanism is automatically adjusted for playing the second ball of the same frame. The foul detector device and the foul control mechanism are operated, and a signal such as light L is operated to apprise the player that he has fouled. Solenoid 550 of valve 705 is also energized to shut off suction in line 707 feeding the resetter units U and hence render them inoperative. A more detailed description of the operation of the foul control mechanism is given hereinafter.

If the second ball of a frame is a normal ball the operation of the machine causes cam follower 269 to engage a depression in either of the cams 189, 190 whereupon lever 267 rocks in the opposite direction to close switch 360 which closes a circuit energizing relay 353 only to close switch 354 and effect the operation of solenoid 355 which controls the operation of the pin transfer mechanism 42. Relay 351 is not energized. Cam 186 or 187 causes the placement of a new set of pins on the alley pending playing of the first ball of the next frame. If a foul is made on the second ball, the same mechanism is operated, the only difference being the addition of signal L which operates to apprise the player of that fact.

The operation of the foul control mechanism is as follows: When the foul indicator switch 528 closes, relay R—1 is energized and all relay contacts *a* to *e* are closed, the relay being locked in through contact *a* and cam operated switch 508. A foul lamp L is lighted through contact *c*. Contact *b* energizes the pin transfer mechanism relay 353 which in turn energizes clutch solenoid 355 through the contact or switch 354. Solenoid 355 upon being energized causes armature 356 to rock lever 357 pivoted thereto out of the path of clutch control member 358 so that the clutch is thrown into operation by drive shaft 53 to effect the feed of a new set of pins P from storage M by means of pin carriages 45. Contact *e* effects the energization of relay R—3 and consequently the closing of contact *f* which in turn energizes solenoid 550 which actuates a valve 705 cutting off the respotting suction supplied through pipe 707. The closing of contact *d* connects the ratchet relay R—2 across the coil of the strike index relay 351. While this condition exists, if relay 351 is energized from any source, relay R—2 will also be energized.

On a first ball foul, when the pin setter table is down, the switch 360*a* is closed by means of arm 267, thus energizing the strike index relay 351 and the ratchet relay R—2 through the contact *b* regardless of whether the ten contacts 320 on the respotting table are closed or not. The table rises without lifting any standing pins because, as described heretofore, resetters U are inoperative because suction which operates them is shut off by means of solenoid 550. As soon as arm 267 returns to its central position, switch 360*a* opens again and releases the ratchet relay R—2, relay 351 and solenoid 160. The release of relay R—2 causes the closing of contacts *g, h,* and *i,* which are connected in multiple with contacts *d, e* and *b,* respectively. Cam 504 then opens switch 508, releasing relays R—1, R—3, 353, and also the solenoids 550 and 355 and in addition extinguishing the foul lamp L. The control cam slide member 184 on shaft 185 shifts, all fallen pins and pins standing on the alley are swept into the pit, ten new pins are reset and the cycle is completed as a normal strike cycle as described heretofore. Contacts *g, h* and *i* remain closed. When cam 504 causes switch 508 to reclose at the end of the cycle, the pin transfer mechanism relay 353 and solenoid 355 are energized again through contact *i,* respotting suction solenoid 550 and relay R—3 are energized through contact *h,* and ratchet relay coil R—2 is connected across relay coil 351 through contact *g.* The machine is then ready for playing the next ball of the same frame.

The start of the following cycle is similar to the one just described with contacts *g, h* and *i* taking over the functions of contacts *d, e* and *b.* The foul lamp L does not light unless a foul is made again. Because slide member 184 on cam shaft 185 has been shifted during the previous cycle, switch 360*a* is closed again. Reopening of switch 360*a* causes the release of relay R—2 thereby effecting the opening of contacts *g, h* and *i.* Once more ten new pins are reset. At the end of the cycle, when switch 508 recloses, nothing happens because relay contacts *g, h* and *i* are open. The machine is back to normal first ball position.

If a foul is made on a second ball without a foul on the preceding first ball, relay R—1 locks in and remains locked in until switch 508 is opened by cam 504. The foul lamp L lights, and solenoid 550 is temporarily energized but nothing else happens, because in the second ball cycle switch 360 is closed by means of lever 267 and relay 351 and the ratchet relay R—2 are not energized.

The automatic foul detecting device operated by means of one or a plurality of photoelectric cells may be replaced by a switch manually operated by a foul judge as illustrated in Figure 34. A hand operated push button switch 560 takes the place of the automatic switch 528 shown in Figure 33. The foul judge may operate a switch board controlling one or a plurality of machines, as desired.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. In a bowling pin setting machine, a setter for placing a set of pins in playing arrangement on the playing surface of a bowling alley, a control device, a sweep, pin resetting units carried by said setter, mechanism normally operating to cause said units to grip, lift and reset any pins standing on said surface as the result of the first ball of a frame thrown, means operated by said device for incapacitating said resetters if a foul is made when said first ball of a frame is thrown, whereby said pins remain standing on said surface, means for operating said sweep to remove said pins, mechanism for feeding a new set of pins to said setter, and mechanism for moving said setter to pin delivery position for delivery of said new set of pins to said surface prior to the throwing of the next ball of the same frame.

2. In a bowling pin setting machine for use with a bowling alley having a pin supporting bed, a setter having a plurality of pin setters and resetting units, mechanism for moving said setter to and from said bed to set and reset pins thereon, a foul declaring device, mechanism normally operating said resetting units to grip standing pins after the first ball of a frame is thrown for lifting and resetting said standing pins, and mechanism controlled by said device for incapacitating said last-named mechanism if a foul is made when said ball is rolled.

3. In a bowling pin setting machine for use with a bowling alley having a pin supporting bed, a setter having a plurality of pin setters and resetting units, mechanism for moving said setter to and from said bed to set and reset pins thereon, a foul declaring device, mechanism normally operating said resetting units to grip standing pins after the first ball of a frame is thrown for lifting and resetting said standing pins, mechanism controlled by said device for incapacitating said last-named mechanism if a foul is made when said ball is rolled, a sweep for sweeping said standing pins from said alley, and means for delivering a new set of pins to said setters for placement on said bed.

4. In a bowling pin setting machine for use with a bowling alley having a pin supporting bed, mechanism for setting pins in playing arrangement on said bed, said mechanism including devices normally operative to replace on said bed pins remaining standing after the first ball of a frame is thrown, and mechanism for preventing the operation of said devices if a foul is made when said first ball of said frame is thrown.

5. In a bowling pin setting machine for use with a bowling alley having a pin supporting bed, a pin spotter provided with pin setters and pin resetters, mechanism for moving said spotter to and from said bed for setting and resetting pins in playing arrangement thereon, said mechanism including means normally operative for placing a set of pins on said alley if all pins are knocked down by the first ball of a frame thrown, and for operating said resetters for resetting any pins remaining standing as a result of the first ball thrown, an automatic foul detector device located adjacent the playing position of said alley, and control means operated by said device when a foul is made when the first ball of a frame is thrown for incapacitating said resetters.

6. In a bowling pin setting machine for use with a bowling alley having a pin supporting bed, a pin spotter provided with pin setters and pin resetters, mechanism for moving said spotter to and from said bed for setting and resetting pins in playing arrangement thereon, said mechanism including means normally operative for placing a set of pins on said alley if all pins are knocked down by the first ball of a frame thrown, and for operating said resetters for resetting any pins remaining standing as a result of the first ball thrown, an automatic foul detector device located adjacent the playing position of said alley, control means operated by said device when a foul is made when the first ball of a frame is thrown for incapacitating said resetters, means for sweeping all pins from said alley and bed, and means for operating said spotter to cause said setters to place a new set of pins on said bed.

7. In a bowling pin setting machine for use with a bowling alley having a pin supporting bed, a pin spotter provided with pin setters and pin resetters, mechanism for moving said spotter to and from said bed for setting and resetting pins in playing arrangement thereon, said mechanism including means normally operative for placing a set of pins on said alley if all pins are knocked down by the first ball of a frame thrown, and for operating said resetters for resetting any pins remaining standing as a result of the first ball thrown, a manual foul indicating device, and control mechanism operated by said device for incapacitating said resetters upon manual operation of said device if a foul is made when the first ball of a frame is thrown.

8. In a bowling pin setting machine for use with an alley having a pin supporting bed, a pin conveyor movable to and from said bed, devices carried by said conveyor for setting and resetting pins in playing arrangement on said bed, mechanism normally operative after the first ball of a frame is thrown for operating said devices and said conveyor to lift and reset any pins remaining standing, a foul control device, and connections between said device and said mechanism for incapacitating said devices when a foul is made on the first ball thrown.

9. In a bowling pin setting machine for use with an alley having a pin supporting bed, a pin conveyor movable to and from said bed, units carried by said conveyor for setting and resetting pins in playing arrangement on said bed, mechanism normally operative after the first ball of a frame is thrown for operating said units and said conveyor to lift and reset any pins remaining standing, a control device responsive to the declaration of a foul, connections between said device and said mechanism for incapacitating said units when a foul is made on the first ball thrown, and means forming a part of said foul control for signaling when a foul is made whenever a ball is thrown.

10. In a bowling pin setting machine, a pin spotter, suction operated pin handling units carried by said spotter and located thereon in substantially pin playing arrangement, means for moving said spotter to and from the playing surface of a bowling alley to set and reset pins thereon, a suction conduit for said units, mechanism for creating suction in said conduit and units for operating said units for lifting and resetting any pins remaining standing as the result of the first ball thrown, a foul control device, and means operated by said device for incapacitating said units whenever a foul is made when the first ball of a frame is thrown.

11. In a bowling pin setting machine for use with an alley having a pin supporting bed, a pin conveyor movable to and from said bed, devices carried by said conveyor for setting and resetting pins in playing arrangement on said bed, mechanism including a suction conduit for creating suction in said devices normally operative after the first ball of a frame is thrown for operating said devices and said conveyor to lift and reset any pins remaining standing, a foul control device, connections between said device and said mechanism for incapacitating said devices when a foul is made on the first ball thrown, means forming a part of said foul control device for signaling when a foul is made whenever a ball is thrown, said connections including a valve in said suction conduit, and means for operating said valve to prevent the creation of suction in said devices.

12. In a bowling pin setting machine, a pin spotter, suction operated pin handling units carried by said spotter and located thereon in substantially pin playing arrangement, means for moving said spotter to and from the playing surface of a bowling alley to set and reset pins thereon, a suction conduit for said units, mechanism for creating suction in said conduit and units for operating said units for lifting and resetting any pins remaining standing as the result of the first ball thrown, a foul control device, means operated by said device for incapacitating said units whenever a foul is made when the first ball of a frame is thrown, a sweep for removing said standing pins from said playing surface, and means or operating said spotter to place a new frame of pins on said surface pending rolling of the next ball of said frame.

13. In a bowling pin setting machine having a pin spotter provided with means for setting and resetting pins on the playing bed of an alley, selectively actuated control mechanism for operating said setter cyclically after the throwing of each ball of a frame to set and reset pins on said bed, said mechanism including strike control means for effecting the delivery of a new set of pins to said bed whenever a strike is made by the first ball of a frame, a foul detector, a foul control mechanism, and means operated by said detector and said foul control mechanism whenever a foul is made when the first ball of a frame is rolled for actuating said strike control means for two successive cycles to effect the delivery of new sets of pins to said bed for playing of the last ball of the same frame, and the first ball of the next frame.

14. In a bowling pin setting machine for use with a bowling alley having a pin supporting bed comprising, a setter having a plurality of pin setters and resetting units, mechanism for moving said setter to and from said bed to set and reset pins thereon, a foul declaring device, mechanism normally operating said resetting units to grip standing pins after the first ball of a frame is thrown for lifting and resetting said standing pins, mechanism controlled by said device for incapacitating said last-named mechanism when a foul is made when the first ball is rolled, means for operating said setter to place a new set of pins on said bed for the next ball of the same frame, and means operative after the last ball of the frame has been rolled for operating said setter to place a new set of pins on said bed for playing the first ball of the next frame.

15. In a bowling pin setting machine, a pin spotter, pin setters and resetters carried by said spotter, means for moving said spotter to and from the playing surface of a bowling alley to set and reset pins thereon, a strike control device, means for operating said device when all pins are knocked down by the first ball of a frame, means for operating said spotter and said resetters to reset any pins standing after the first ball is thrown, means for operating said spotter to cause said setters to place a new set of pins on said surface after the last ball of a frame is thrown, a foul detector device, mechanism operated by said device for actuating said strike control device regardless of the number of pins knocked down by the first ball of a frame when a foul is made to effect the delivery of a new set of pins to said surface prior to playing the next ball of the same frame, and means operative as the result of the operation of said device for operating said spotter to effect the delivery of a new set of pins to said surface after the second ball of the same frame is thrown awaiting the playing of the next frame.

16. A bowling pin setting machine comprising a device for setting pins upon the playing surface of a bowling alley, a device for resetting standing pins after the throwing of the first ball of a frame, mechanism for controlling the operation of said devices, said mechanism including means for causing said first-named device to set a new set of pins on said surface after the rolling of the first ball of a frame and preparatory to the rolling of the first ball of the next frame if all pins are knocked down by said first ball, a foul detector, mechanism operated by said detector, including operating connections to said means effecting the operation of said means thereby actuating said first-named device to set a new set of pins on said alley preparatory to the rolling of the next ball of the same frame if a foul is made on the first ball of a frame, regardless of the number of pins knocked down by said last-mentioned ball, and means responsive to the operation of said detector for incapacitating said resetting device.

17. A bowling pin setting machine comprising a device for setting pins upon the playing surface of a bowling alley, a device for resetting standing pins after the throwing of the first ball of a frame, mechanism for controlling the operation of said devices, said mechanism including means for causing said first-named device to set a new set of pins on said surface after the rolling of the first ball of a frame and preparatory to the rolling of the first ball of the next frame if all pins are knocked down by said first ball, a foul detector, mechanism operated by said detector, including operating connections to said means effecting the operation of said means thereby actuating said first-mentioned device to set a new set of pins on said alley preparatory to the rolling of the next ball of the same frame if a foul is made on the first ball of a frame, regardless of the number of pins knocked down by said last mentioned ball, means responsive to the operation of said detector for incapacitating said resetting device, a signal forming a part of said detector and means for operating said signal whenever a foul is made.

18. In a bowling pin setting machine for use with a bowling alley having a pin supporting bed, mechanism for placing a set of pins in playing arrangement on said bed, a control device for automatically and selectively operating said mechanism in response to the making of a strike to place a new set of pins on said bed and preparatory to rolling the first ball of the next frame, a signalling device for signalling illegal pinfall, and presetting means responsive to the actuation of said signalling device for causing said mechanism to place a new set of pins on said bed after both the first ball and the second ball of a frame, regardless of the number of pins knocked down by said last-mentioned first ball.

19. In a bowling pin setting machine for use with a bowling alley having a pin supporting bed, a pin spotter device for placing a set of pins in playing arrangement on said bed, a pin respotter device for respotting standing pins on said bed, mechanism operative to cause said pin spotter device to place a new set of pins on said bed in response to the making of a strike and preparatory to the rolling of the first ball of the next frame, a signalling device for signalling illegal pinfall, a control device responsive to the actuation of said signalling device to incapacitate said respotter device, presetting means responsive to the actuation of said signalling device for causing said mechanism to place a new set of pins on said bed after both the first ball and the second ball of the same frame, regardless of the number of pins knocked down by the last-mentioned first ball, mechanism for removing fallen and unwanted pins from said alley bed, and means for operating said last-named mechanism.

20. In a bowling pin spotting machine for use with a bowling alley having a pin supporting bed, mechanism for placing a set of pins in playing arrangement on said bed, said mechanism including respotters for resetting any standing pins in on or off-spot positions on said bed after the first ball of a frame is rolled preparatory to the rolling of the next ball of the same frame, an alley sweep, and a control device, means operated by said control device for causing said mechanism to place a new set of pins on said bed if a strike is made by the first ball of a frame, means for actuating said respotters if any pins remain standing after the first ball of a frame is rolled, a foul detector, means connecting said foul detector to said control device, including means for actuating said control device after a foul first ball of a frame is rolled to cause said mechanism to place a new set of pins on said bed in response to the operation of said detector irrespective of the number of pins remaining standing after said foul first ball, and means for incapacitating said respotters in response to the actuation of said foul detector, and means for actuating said sweep to remove from said alley all pins left standing on said bed.

WILLIAM C. BROEKHUYSEN.

REFERENCES CITED

The following references are of record in the file of this patent:

UNITED STATES PATENTS

| Number | Name | Date |
|---|---|---|
| 1,706,271 | Williams | Mar. 19, 1929 |
| 1,896,383 | White | Feb. 7, 1933 |
| 1,911,436 | Cone | May 30, 1933 |
| 1,994,411 | Thomas | Mar. 12, 1935 |
| 2,298,718 | Nejedly | Oct. 13, 1942 |